United States Patent [19]

van Bilzem et al.

[11] 3,999,161
[45] Dec. 21, 1976

[54] METHOD AND DEVICE FOR THE RECOGNITION OF CHARACTERS, PREFERABLY OF FIGURES

[75] Inventors: Jan Frederik van Bilzem, Zoetermeer; Arie Adriaan Spanjersberg, Leiderdorp; Joannes van Staveren, Zoetermeer, all of Netherlands

[73] Assignee: De Staat der Nederlanden, te Dezen Vertegenwoordigd Door de Directeur-Generaal der Posterijen, Telegrafie en Telefonie, The Hague, Netherlands

[22] Filed: July 22, 1974

[21] Appl. No.: 490,653

[30] Foreign Application Priority Data

July 30, 1973  Netherlands ...................... 7310524
Mar. 15, 1974  Netherlands ...................... 7403516
Apr. 19, 1974  Netherlands ...................... 7405344

[52] U.S. Cl. ........... 340/146.3 AC; 340/146.3 MA; 340/146.3 S
[51] Int. Cl.² ......................................... G06K 9/12
[58] Field of Search ............. 340/146.3 S, 146.3 T, 340/146.3 AC, 146.3 AQ, 146.3 MA, 146.3 J

[56] References Cited

UNITED STATES PATENTS

| | | | |
|---|---|---|---|
| 3,136,976 | 6/1964 | Dietrich | 340/146.3 AC |
| 3,233,219 | 2/1966 | Atrubin et al. | 340/146.3 S |
| 3,341,814 | 9/1967 | Chow | 340/146.3 S |
| 3,381,274 | 4/1968 | Quade et al. | 340/146.3 T |
| 3,585,592 | 6/1971 | Kiji et al. | 340/146.3 AC |
| 3,643,215 | 2/1972 | Ingham et al. | 340/146.3 S |
| 3,786,416 | 1/1974 | Bhimani | 340/146.3 AC |
| 3,873,972 | 3/1975 | Levine | 340/146.3 AC |

*Primary Examiner*—Leo H. Boudreau
*Attorney, Agent, or Firm*—Hugh A. Kirk

[57] ABSTRACT

The invention relates to a method for the automatic recognition of characters, preferably of figures, which may be hand-written on an information carrier provided with an arrangement of demarcated rectangles-one for each character. These handwritten characters are projected on to a matrix, where a camera tube ensures the scanning of the matrix, and the information thus read is recorded in a store and subsequently handled by a processor.

A device for carrying out this method comprises a character pattern manipulator connected to the store in the processor, the output of which manipulator is connected to a number of properties of signals derived from scanning the characters. This manipulator comprises means for copying or transferring the information stored in the processor to other storing matrices, rotating the information stored therein in successive 90° turns, shifting and dividing the stored information, and erasing undesired information parts from the rectangles. The detecting circuitry comprises the detection of discontinuities or "jumps" in lines stored in the matrices, the slopes of the lines, the terminal points of the lines, and the numbers of each in each partial character; and the detection of "islands" or substantially surrounded areas in the matrices of secondary images of the character, including their number and the borders of said "islands".

19 Claims, 74 Drawing Figures

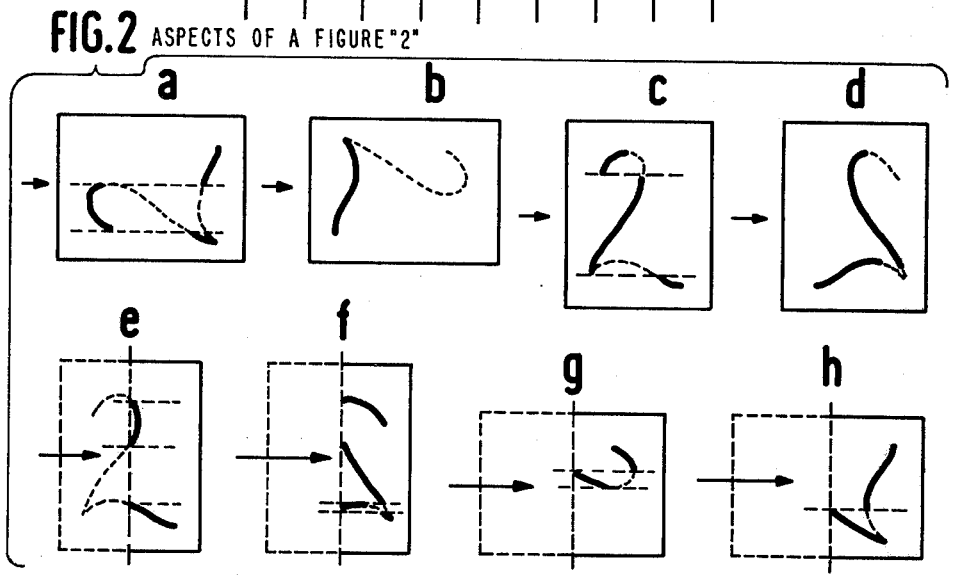
FIG. 1 — MATRIX OF PROPERTIES OF TEN DIGITS / PROPERTIES OF EACH DIGIT / SUM OF PROPERTIES
FIG. 2 ASPECTS OF A FIGURE "2"
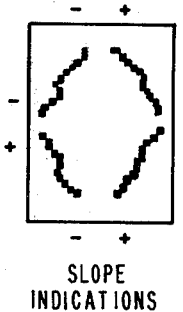
FIG. 3 SLOPE INDICATIONS
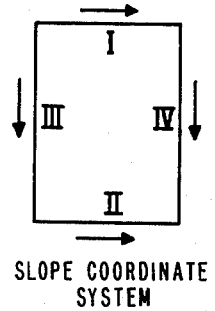
FIG. 4 SLOPE COORDINATE SYSTEM

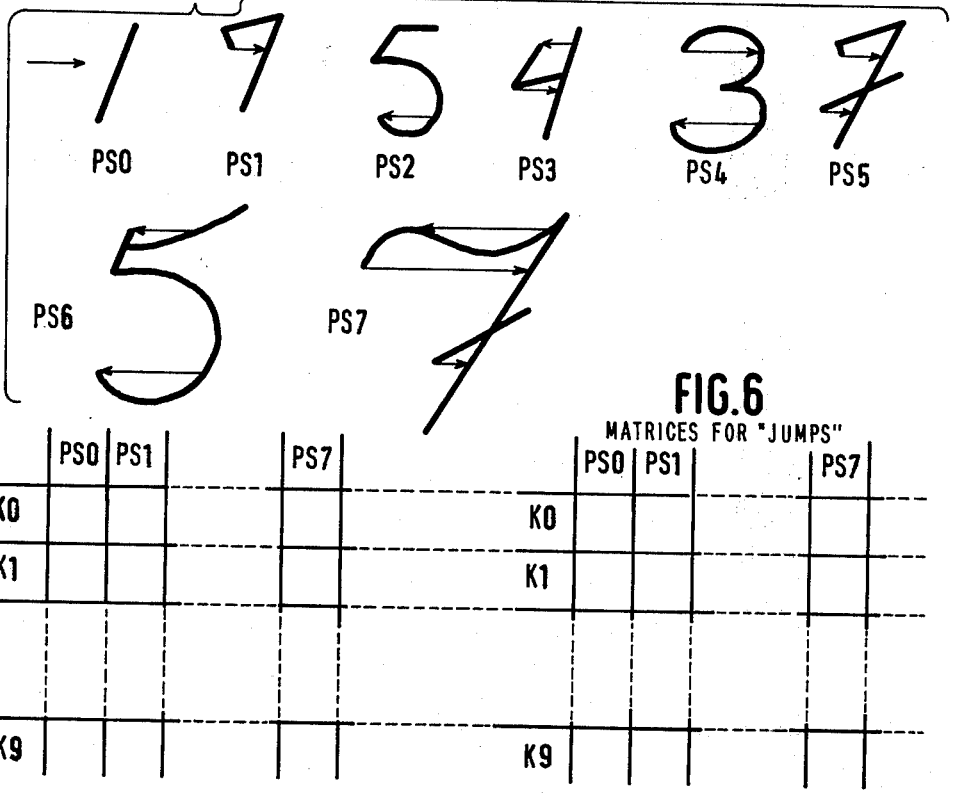
FIG.5 EXAMPLES OF CLASSIFICATION OF ASPECTS OF HANDWRITTEN FIGURES
FIG.6 MATRICES FOR "JUMPS"
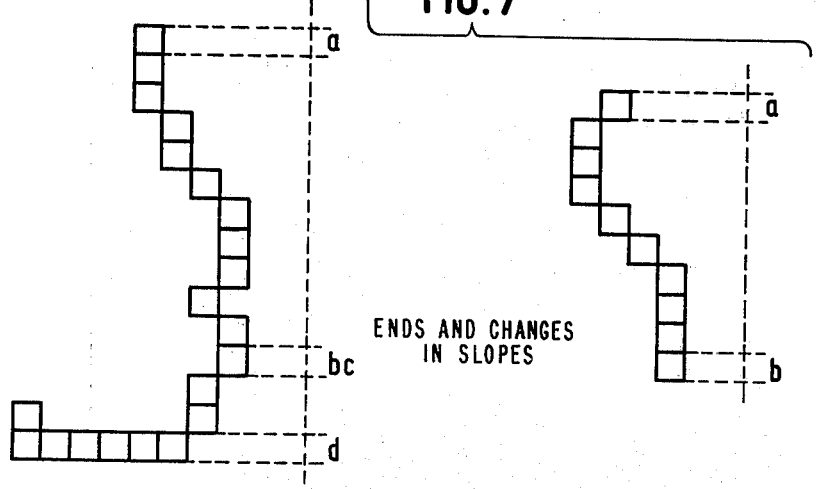
FIG.7
ENDS AND CHANGES IN SLOPES

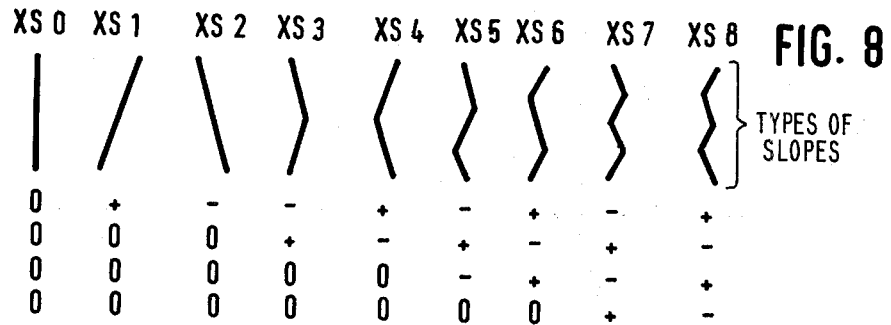
FIG. 8 TYPES OF SLOPES
FIG. 9 (X56)
FIG. 10 (X55)
FIG. 11
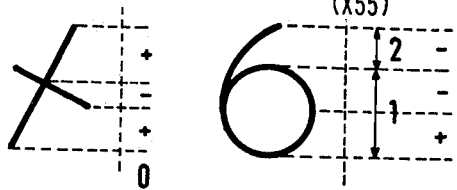
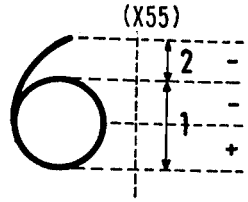
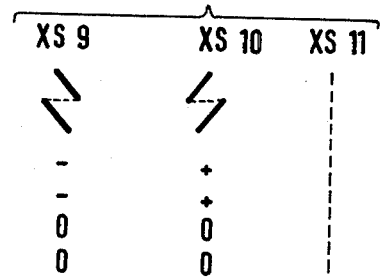
FIG. 12 MATRICES OF SLOPES
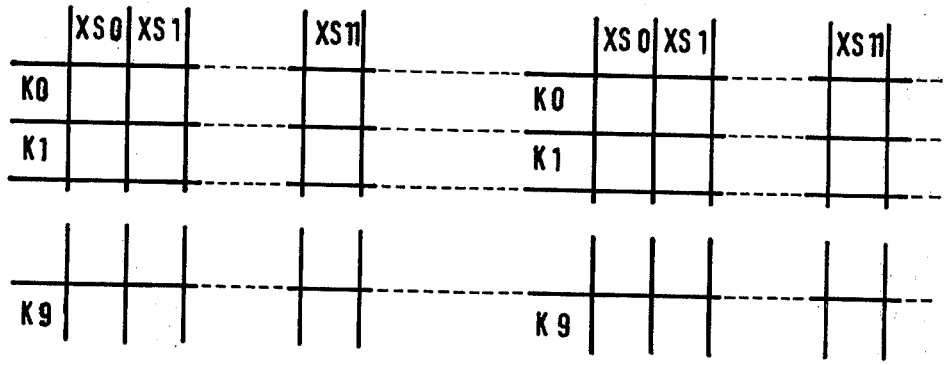
FIG. 13 TERMINAL POINTS
FIG. 14
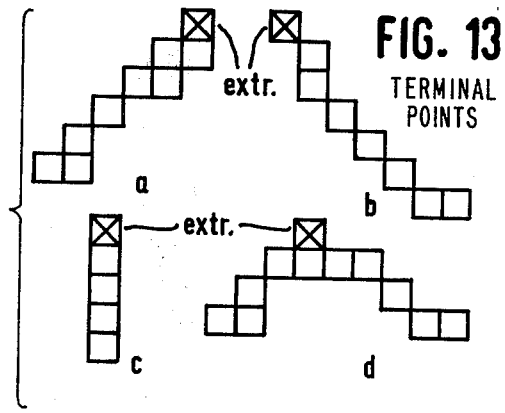
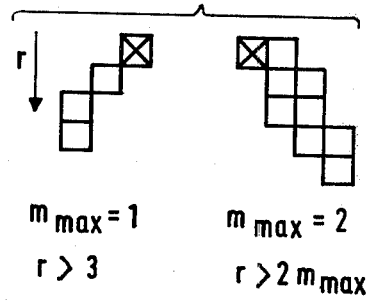
$m_{max} = 1$   $m_{max} = 2$
$r > 3$         $r > 2 m_{max}$

"ISLAND" FORMING

SECONDARY IMAGE
(3 "ISLANDS")

(2 "ISLANDS)

(2 "ISLANDS")

PART OF PATTERN MANIPULATOR FOR COPYING

FIG. 24 0° 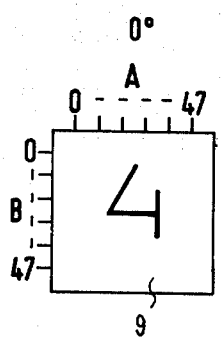 FIG. 25 90°  FIG. 26 180° 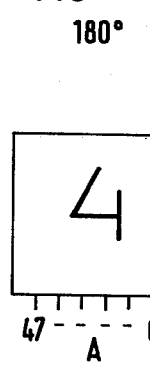 FIG. 27 270° 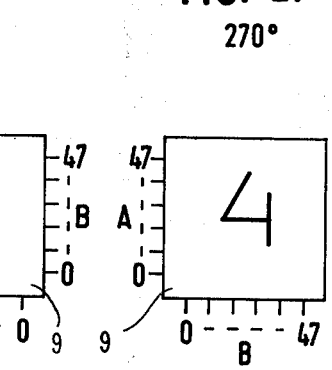
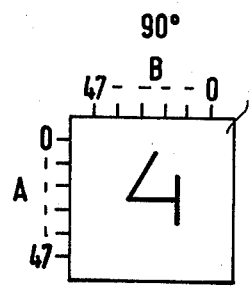 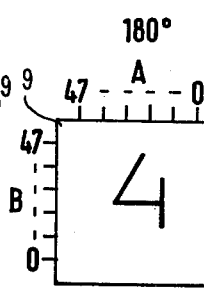 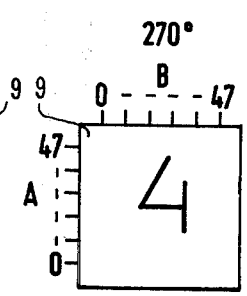
FIG. 28 90°    FIG. 29 180°    FIG. 30 270°
FIG. 31
PART OF PATTERN MANIPULATOR FOR ROTATING
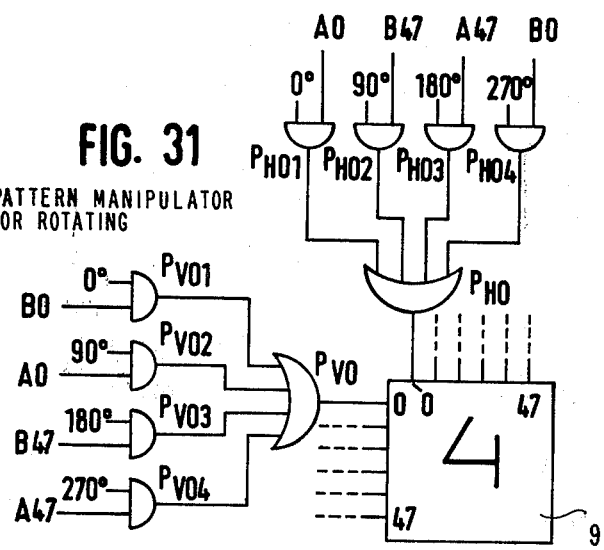

FIG. 32
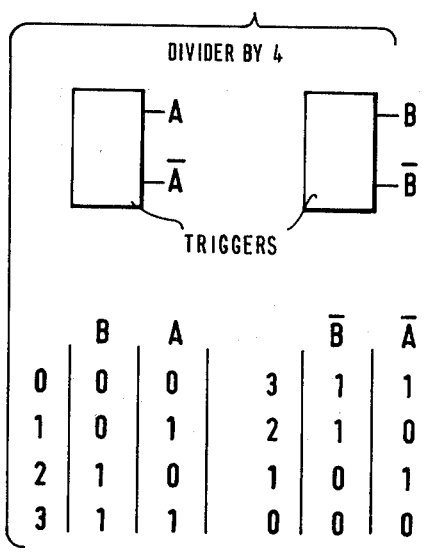
FIG. 33
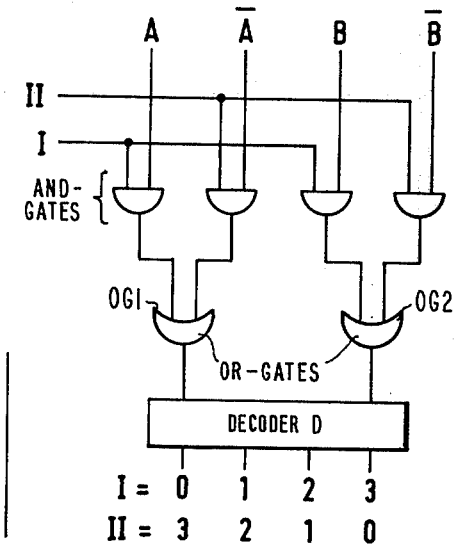
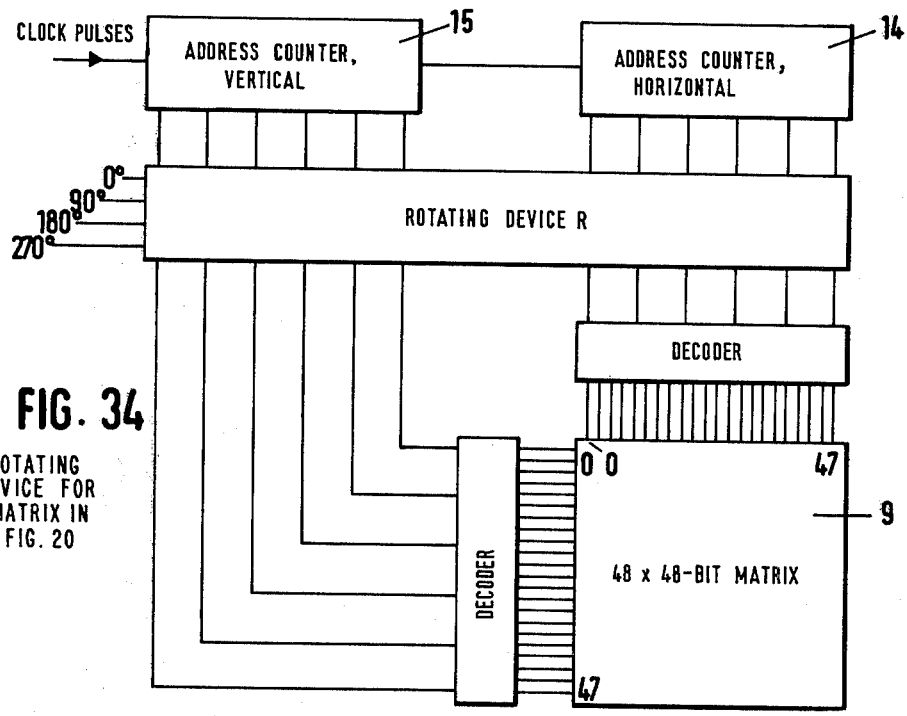
FIG. 34
ROTATING DEVICE FOR MATRIX IN FIG. 20

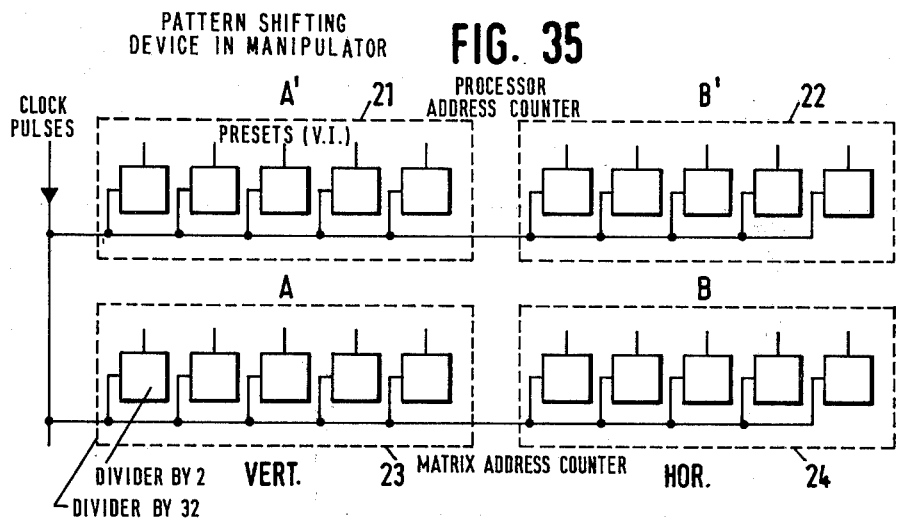
FIG. 35 PATTERN SHIFTING DEVICE IN MANIPULATOR
FIG. 36
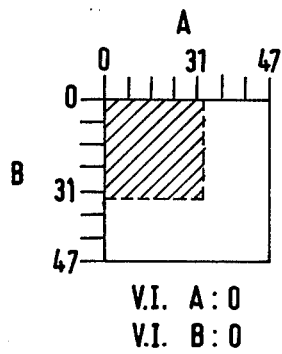
V.I. A : 0
V.I. B : 0
FIG. 37
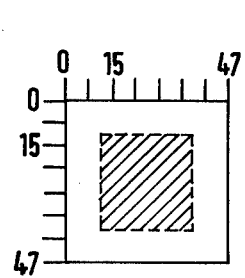
V.I. A : 8
V.I. B : 8
FIG. 38
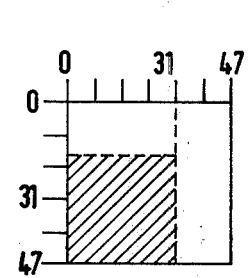
V.I. A : 0
V.I. B : 16
FIG. 39
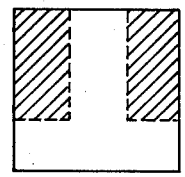
V.I. A : 32
V.I. B : 0
FIG. 40
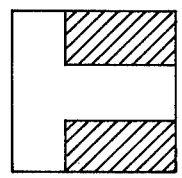
V.I. A : 16
V.I. B : 32
FIG. 41
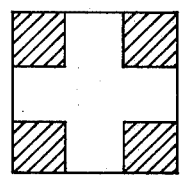
V.I. A : 32
V.I. B : 32
PRESETS

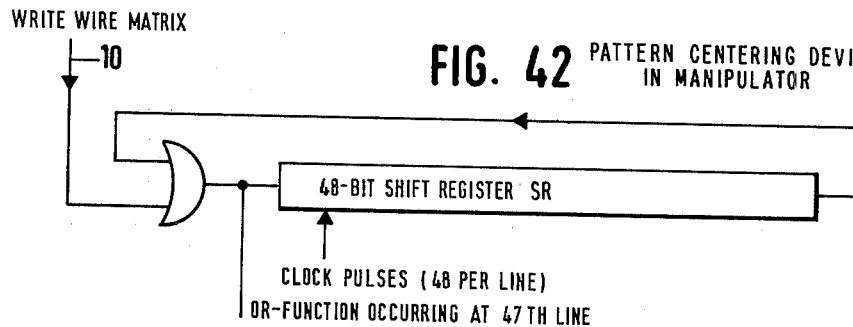
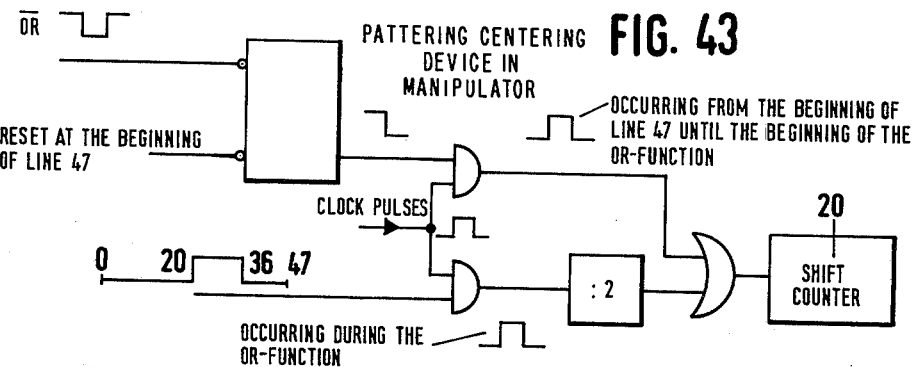
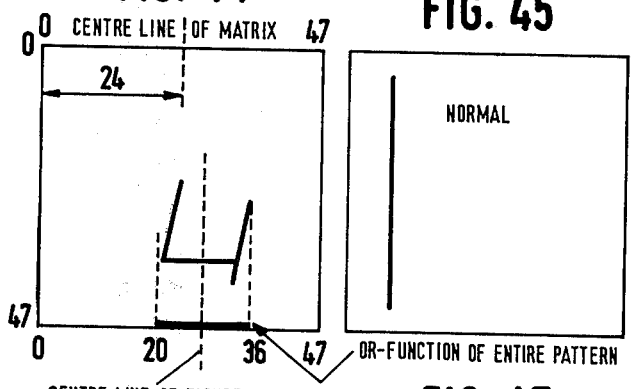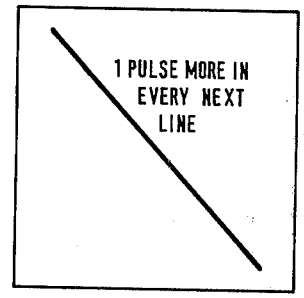
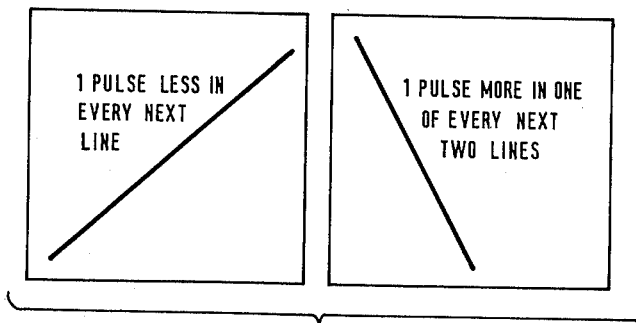
PATTERN ADJUSTING

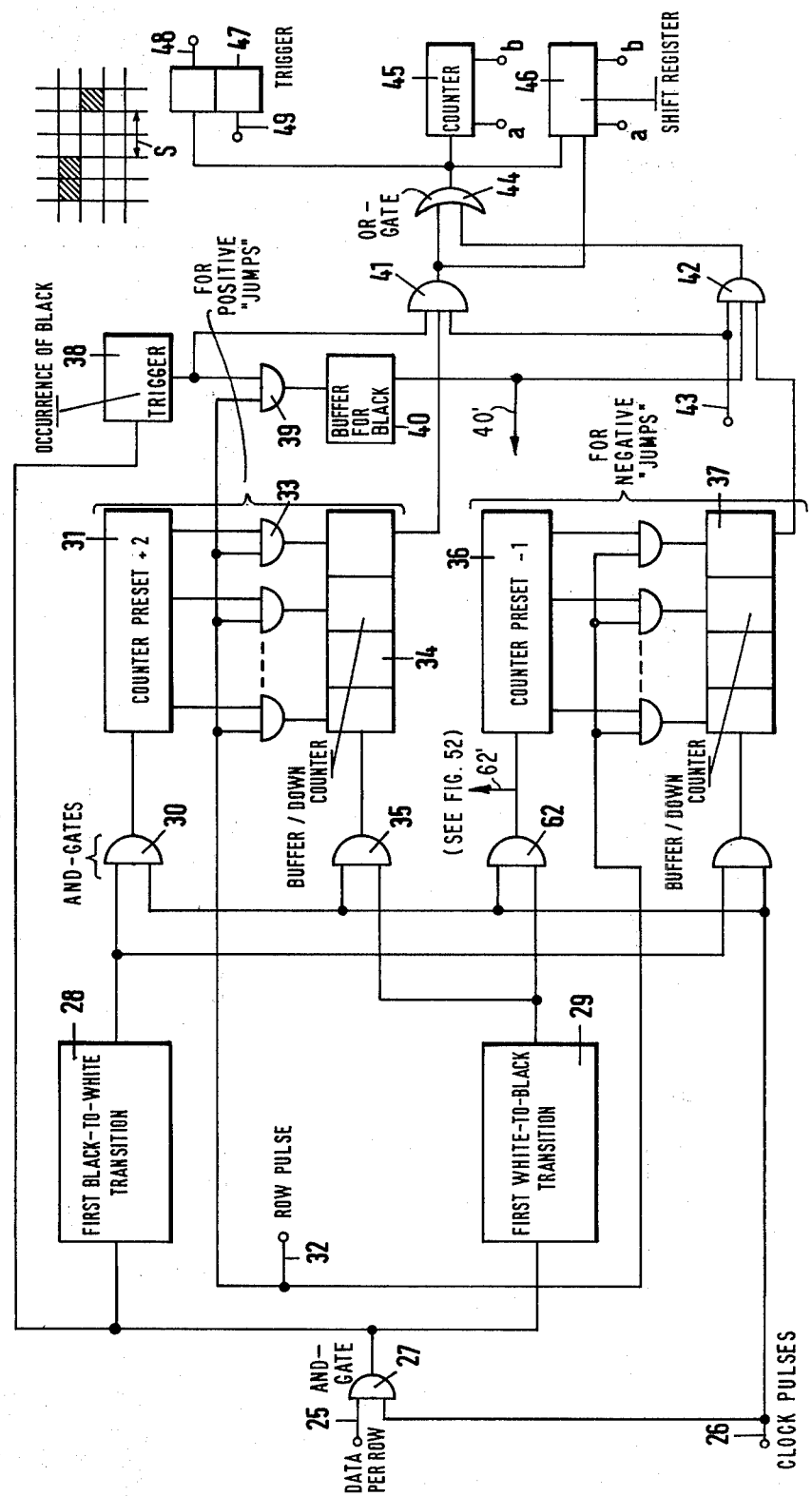

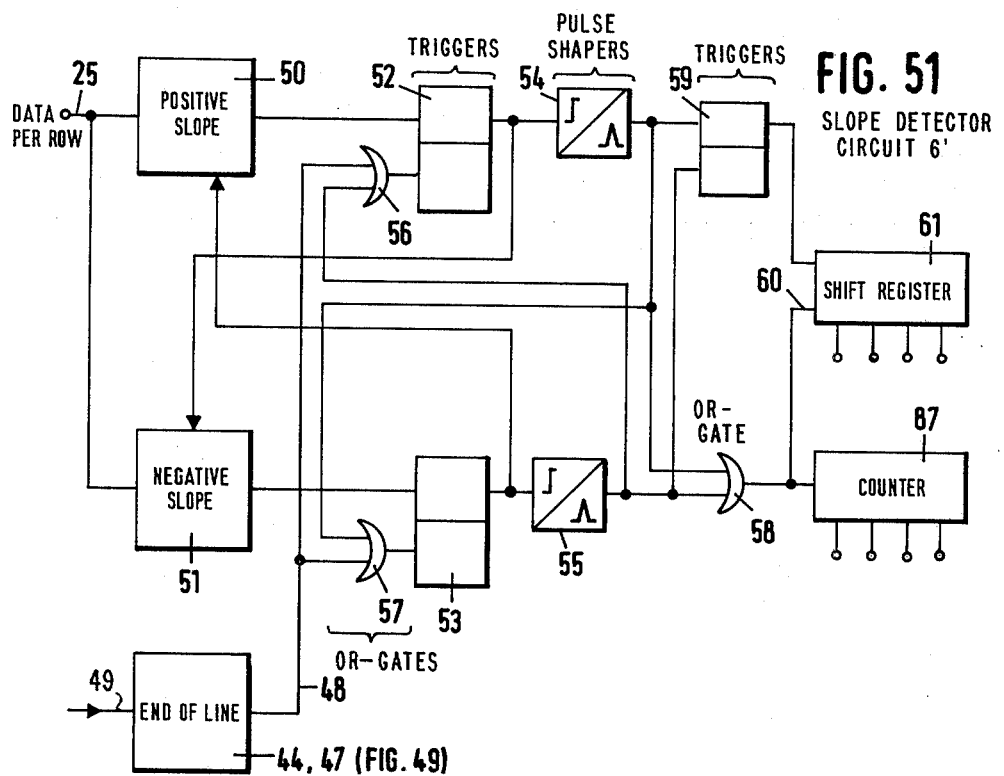

FIG. 56 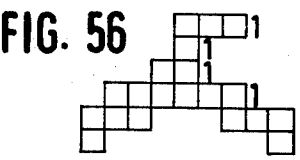 FIG. 57 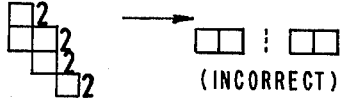

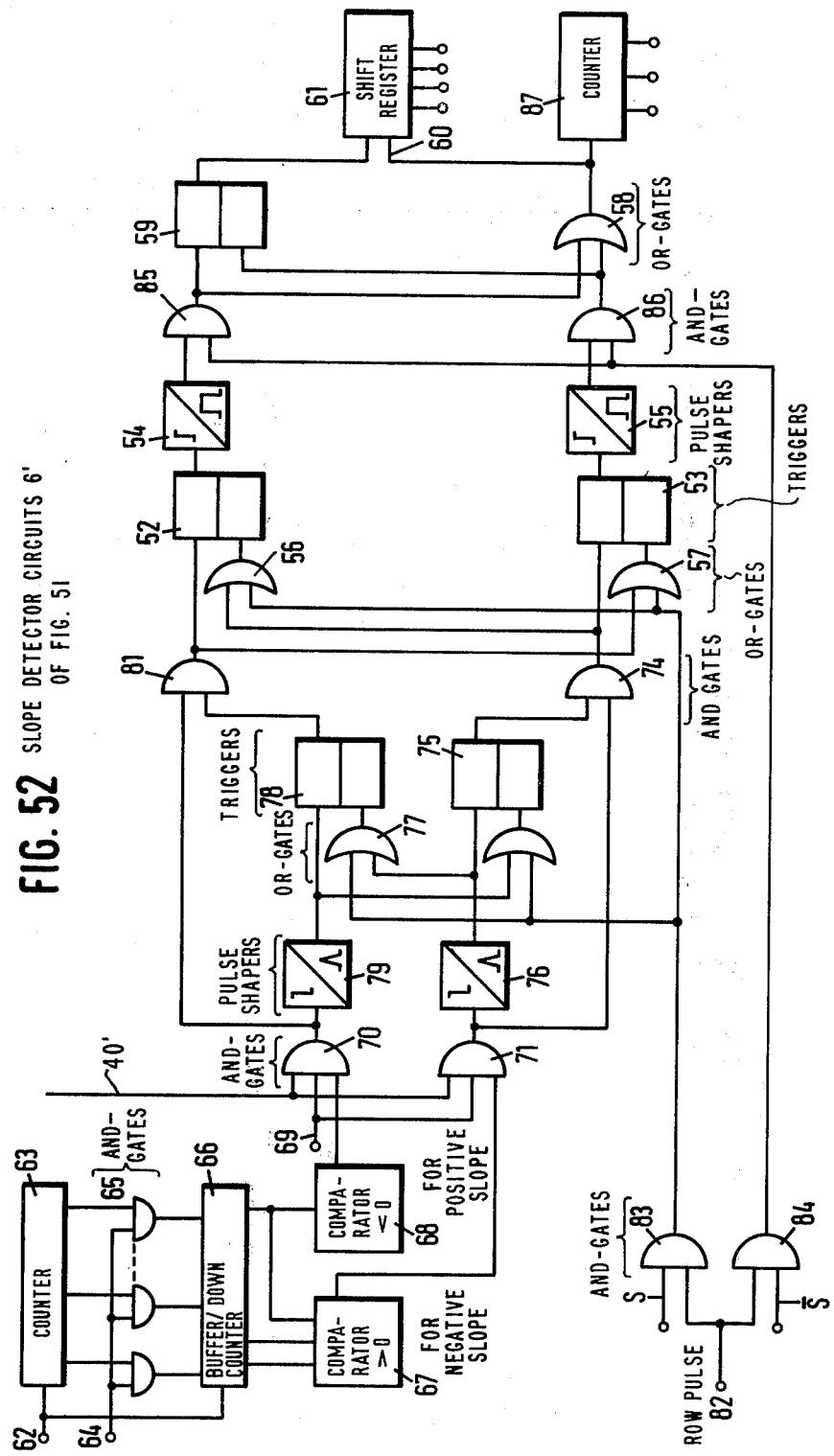

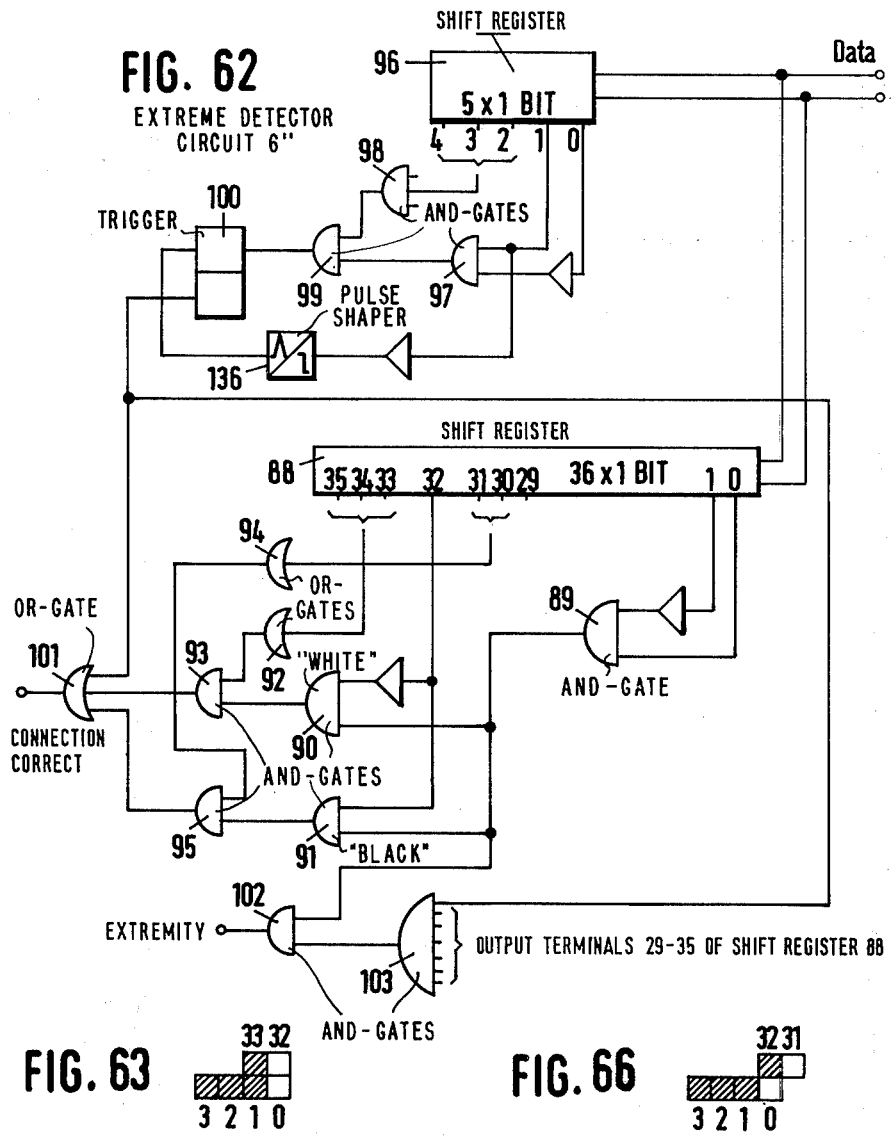

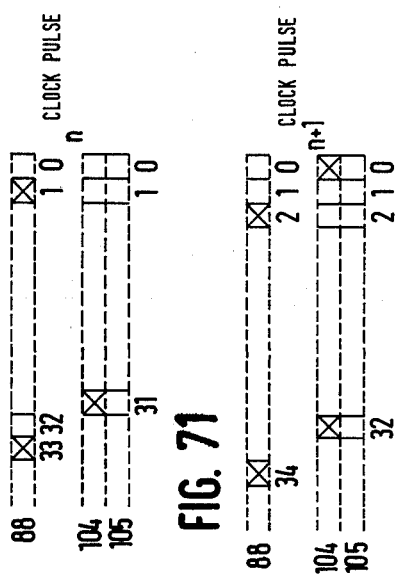
FIG. 70
FIG. 71
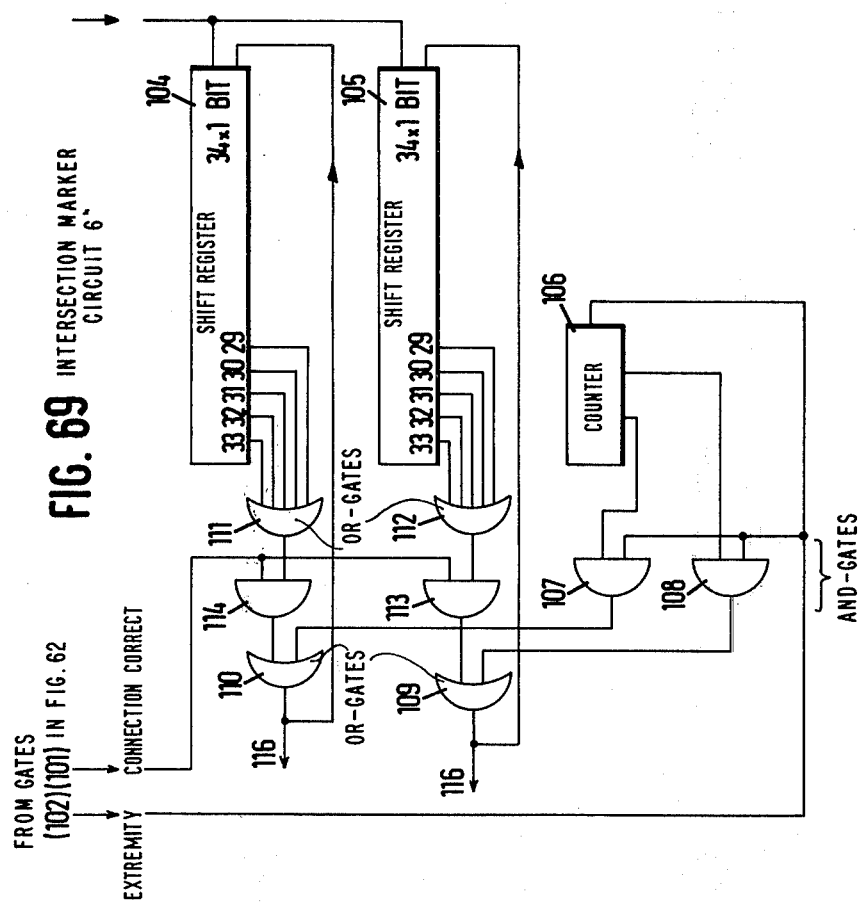
FIG. 69 INTERSECTION MARKER CIRCUIT 6"

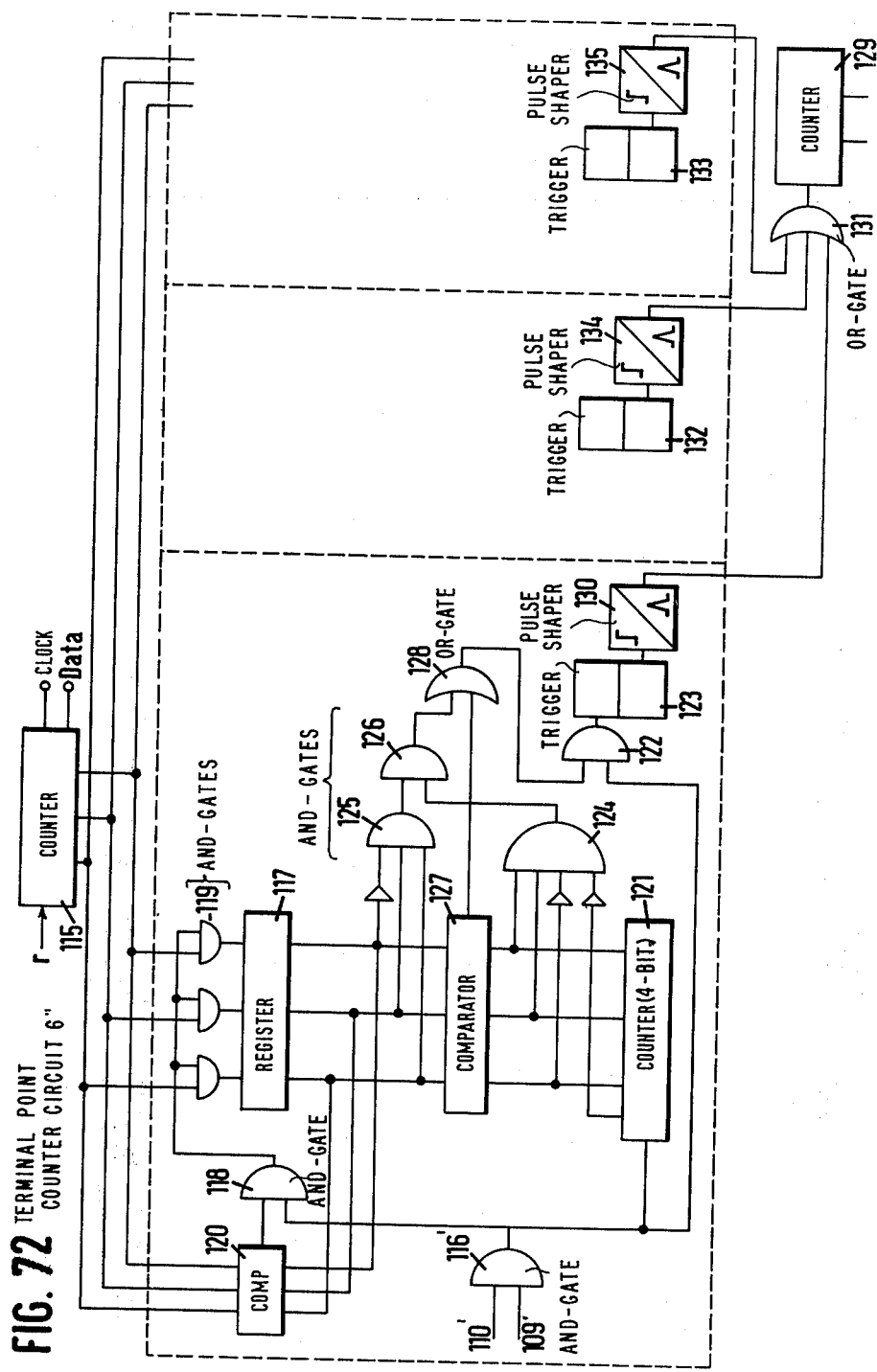

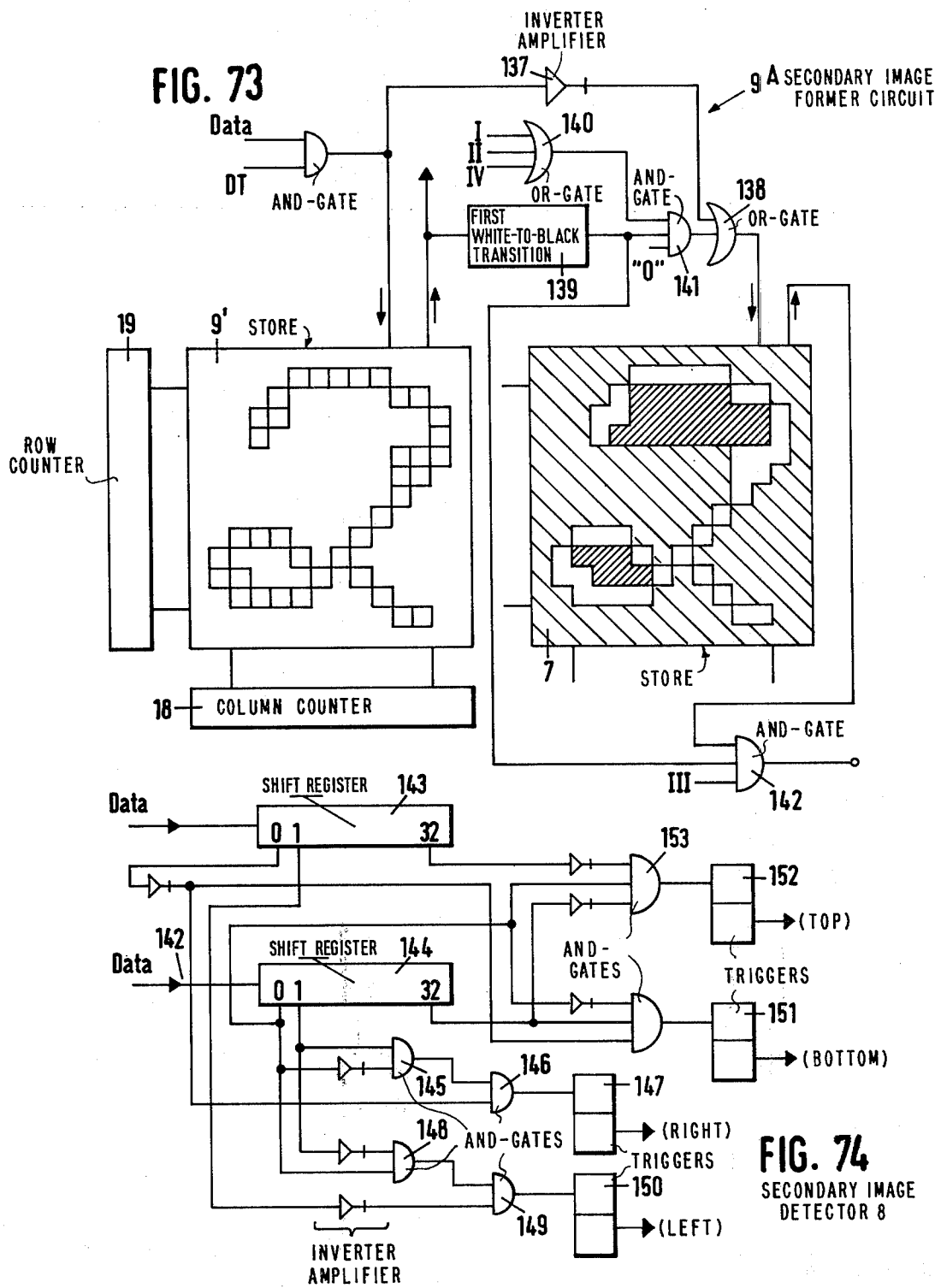

METHOD AND DEVICE FOR THE RECOGNITION OF CHARACTERS, PREFERABLY OF FIGURES

BACKGROUND OF THE INVENTION

In a known method of this kind each rectangle is scanned in a number of vertical lines, the characters to be recognized being divided into groups according to the number of intersections they make with the scanning lines. A further classification within each group takes place according to characteristic properties. In the recognition process the processor subjects the numerical values thus obtained to certain specified treatments. The aforesaid characteristic properties lie in the store of the processor, contained as they are in so-called decision schemes. In the known method it is not easy to change the store contents utilized for testing the characters that have to be recognized. Besides, the recognition process is rather roundabout. Furthermore, the characters have to meet some predetermined criteria.

Automatic recognition systems in which partial images are examined for the purpose of finding their characteristics are also known. In such systems the characteristics dealt with can be considered as a coded representation of all the increments and decrements of the function recorded in a matrix and having the shape of a pattern. To ascertain the presence of a property it is necessary that the coding derived from a pattern to be recognized completely corresponds with a coding recorded in the store of the reading machine. As a great many codings of increments and decrements may occur in practice, owing to the intricate structure of handwriting, such a method requires a large storage capacity. Furthermore the looking-up of the desired coding in the machine store is a complicated and time-absorbing procedure. It may also happen that the relevant coding is not found in the machine store and is thus lost for recognition.

SUMMARY OF THE INVENTION

It is an object of the invention to provide a method in which a character is not assigned to a certain class on account of its satisfying the criteria set for that class by the designer, but on account of the probability of its belonging to the relevant group because of the occurrence of a number of properties in the characters. This object is attained in a learning phase in which and in a subsequent working phase partial images and secondary images are formed from the characters, and the properties of the characters are classified according to complexity. The classification within each group of properties is carried out for each of the partial images and secondary images, so that during the learning phase the results of these classifications are recorded as statistic frequencies in a store. After this the learning phase is concluded by recording the logarithmic values of the static frequencies in the store. During the working phase the results of the classification of the properties of freshly introduced characters are utilized in determining, for each class of characters, the product-probability of the properties found by adding up the relevant logarithmic values.

During the learning phase a large number of figures or other characters - as e.g. letters - of the kind to be recognized by a machine for carrying out the method, are tested for certain properties and the probability of occurrence of each of these properties is determined. The number of properties can be increased at will. The method described has been put into practice with a limited number of figures for the learning phase and with a limited number of properties, and the result obtained was considerably better than that of the best method known so far.

The partial images are preferably constituted by the various aspects of complete characters and of parts of characters halved in a vertical or in a horizontal direction.

It is to be recommended to have a first group of properties bear on the discontinuity of lines in aspects in the plane of a figure; a second group of properties on slope configurations of lines in aspects in the plane of a figure; a third group on the occurrence of terminal points in aspects in the plane of a figure, and a fourth on the number of partial areas of which the secondary image consists and on the way each partial area is bordered. The secondary image of a character to be handled is formed by a part of the surface taken by the character, which part remains after the character elements up to and including the first intersection counted from the sides of the enclosing rectangle have been removed and after all the character elements still remaining have been taken away. The properties of these partial areas are derived from a top, a bottom, a left-hand and a right-hand aspect of the secondary image. The partial areas are also called "islands" in what follows.

The invention further relates to a device for carrying out the above mentioned method, provided with a device for projecting a character onto a matrix, a camera tube for scanning the matrices, a store for recording the scanning results, a converter of the scanning results, and a processor for handling the converted data.

The device according to the invention is provided with a pattern manipulator comprising a matrix store and means for copying means for rotating by multiples of 90°, means for shifting by multiples of one bit in a horizontal and/or in a vertical direction, means for centring, means for adjusting patterns and for handling pattern strips. All of this is for the purpose of forming partial images in which the character is seen from several different inside and outside viewpoints. This pattern manipulator also is connected to circuits for simultaneously detecting and classifying different properties of the partial images.

Thus the detection of $m \times x \cdot n$ properties, $n$ being the number of kinds of properties and $m$ the number of partial images, requires only one manipulator and $n$ circuits.

According to the invention a circuit for detecting and classifying discontinuities or jumps of lines in partial images drawn from the store comprises a counter for determining the distance to the first black-to-white transition and a buffer/down counter for determining the distance to the first white-to-black transition of the next row. These two counters together serve to detect a positive jump. Next the circuit also comprises a counter and a buffer/down counter for detecting a negative jump, comprising a device for detecting a first black-to-white transition and a first white-to-black transition serving to block the counters. Lastly, the counter output terminals are connected to a counter and a shift register, which, in combination, serve for classifying the discontinuities.

According to the invention a circuit for detecting and classifying slope configurations in partial images drawn from the store comprises means for detecting a positive and a negative slope and the end of a line, a shift register for determining the succession of positive and negative slopes, and a counter for determining the number of successive slopes.

According to the invention a circuit for detecting and counting terminal points comprises, firstly, a circuit for finding extremes by means of a shift register and a logic circuit for comparing two consecutive rows of a character pattern, and at the same time discriminating according to predetermined conditions. Secondly, a circuit for scanning lines having extremes, a shift register being so arranged that a marking attributed to the line is suppressed when lines do not join, whereas it is maintained as long as the joining point meets the conditions set. And thirdly, a circuit for determining the number of terminal points in an aspect, comprising a first counter for joined black image elements, a register for the largest thickness of line occurring in an extreme, a first comparator for comparing the contents of the counter with those of the register, a second counter for counting the rows of image elements in the case of a joint, a second comparator for comparing the contents of the register with those of the first counter, a logic circuit for discriminating the results of the comparisons according to predetermined conditions, and a third counter for recording the number of terminal points in an aspect.

The device also preferably comprises a working store and a circuit capable of forming a secondary image, consisting of partial areas called "islands," from the inverted information of the quantized pattern. This secondary image forming device contains a device for detecting first white-to-black transitions, the output terminal of which is connected to an AND-gate, owing to which all image elements not forming part of the character proper, from each of the sides of the rectangle enclosing the character, are ignored.

A circuit for detecting and classifying the properties of secondary images may comprise two shift registers for synchronously taking up data, notably for taking up data from the original pattern in one shift register and data from the secondary image in the other, so that the nature of the border between an "island" and the original pattern can be established and recorded with the aid of gates and triggers.

BRIEF DESCRIPTION OF THE VIEWS

The above mentioned and other features, objects and advantages, and a manner of obtaining them are described more specifically below by reference to an embodiment of this invention shown in the accompanying drawing wherein:

FIG. 1 shows a matrix of properties of characters considered and summed by the system of the present invention;

FIG. 2 shows examples of eight aspects of a handwritten FIG. 2 within a demarcated rectangle as considered according to the system of this invention;

FIG. 3 shows indications of the four different types of slopes for lines of characters within a demarcated rectangle;

FIG. 4 shows a co-ordinate system for the positive and negative slopes in a demarcated rectangle as shown in FIG. 3;

FIG. 5 shows examples of classification of some aspects of handwritten Arabic numbers of figures;

FIG. 6 shows the matrices for the discontinuities or "jumps" considered by the system of this invention;

FIGS. 7 through 11 show the different types of slope configurations considered in characters in a demarcated area considered by the system of this invention;

FIG. 12 shows matrices for slope configurations shown in FIGS. 8 and 11 considered by the system of this invention;

FIGS. 13 and 14 show the types of terminal points considered by the system of this invention;

Figure 19:
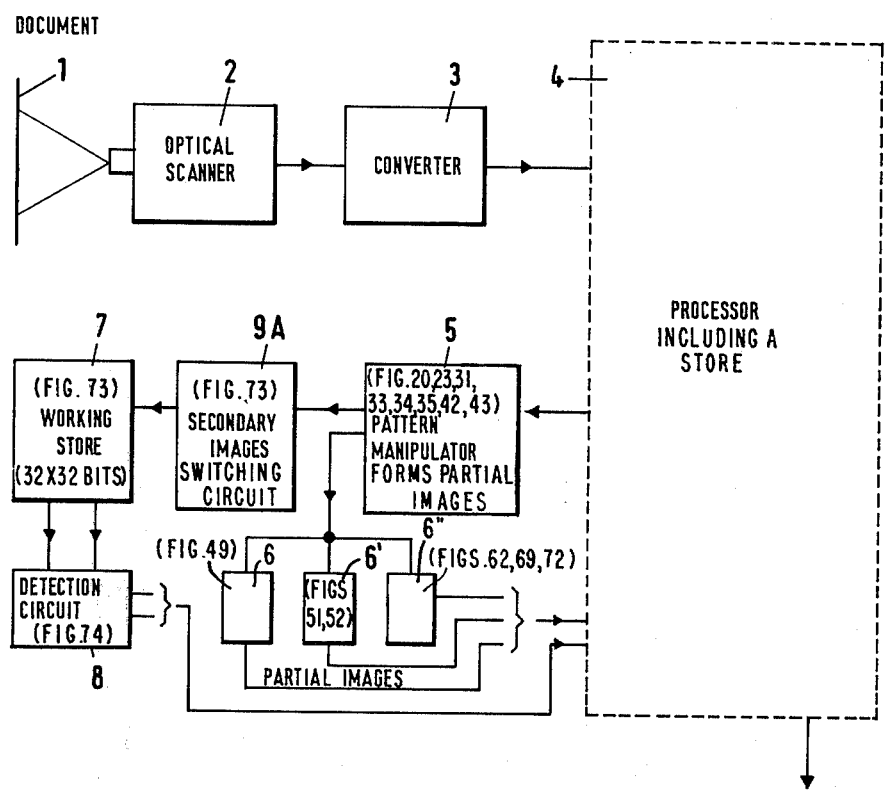
FIG. 19 is a general schematic block wiring diagram of a preferred embodiment of a device or apparatus for carrying out the detection of the aspects of characters or figures according to the steps of the method of this invention.
Figure 20:
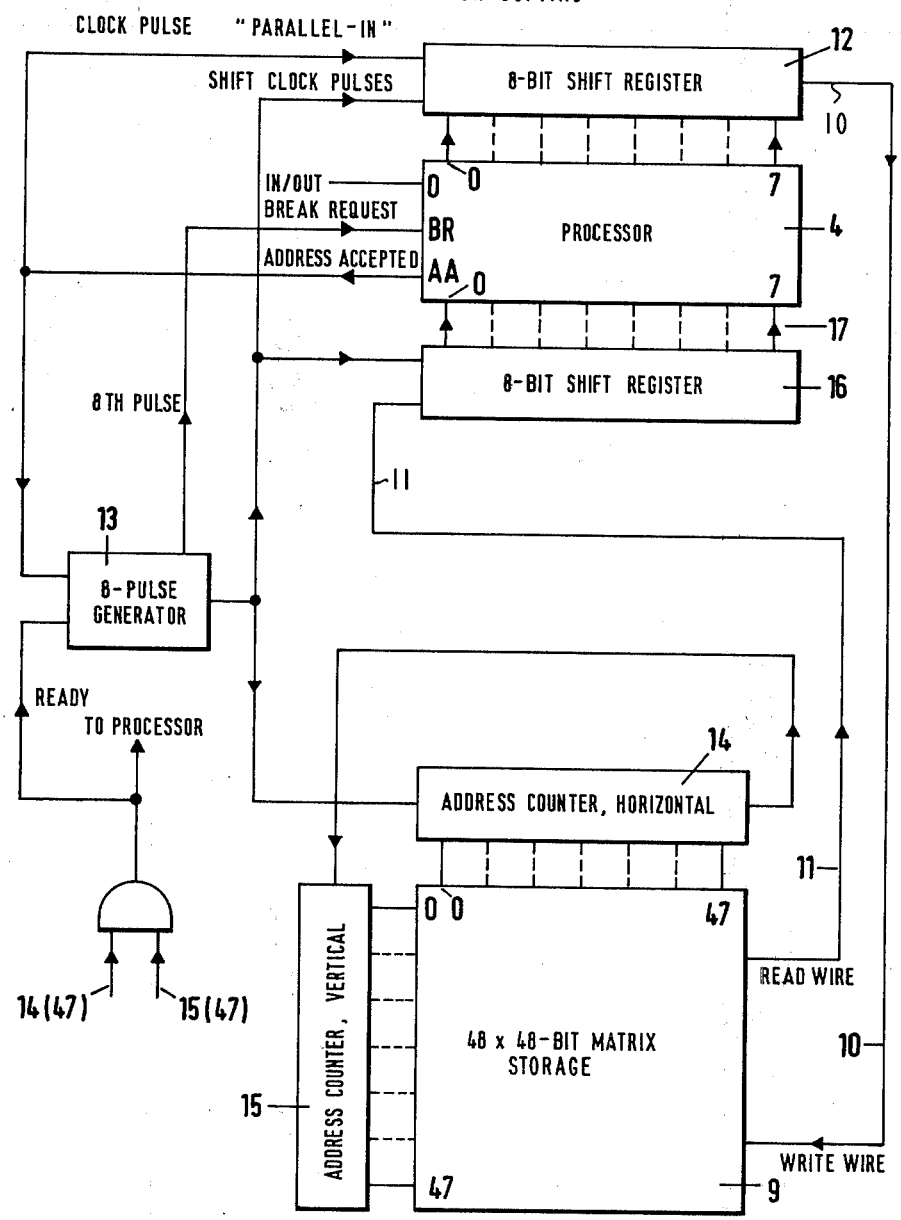
FIG. 20 is a schematic block wiring diagram of the part of the manipulating circuit 5 shown in FIG. 19 for the coupling of a processor to an external store for copying the matrix in a store.

FIGS. 24 through 30 show various matrix connection modes for considering a character or figure, herein 4, stored therein from different 90° directions;

FIG. 31 is a schematic block wiring diagram of the part of the manipulator circuit 5 shown in FIG. 19 for rotating the address lines of a matrix store for considering a character from the different directions shown in FIGS. 24 through 30;

FIG. 32 is a schematic block diagram of a part of the manipulator circuit 5 shown in FIG. 19 showing a divider by four and a table of the conditions of its output terminals;

FIG. 33 is a schematic block wiring diagram of another part of the manipulator circuit 5 in FIG. 19 showing a circuit with a decoder controlled by the divider by four shown in FIG. 32;

FIG. 34 is a schematic block wiring diagram of a further part of the circuit shown in FIG. 20 for rotating the pattern stored in the matrix 9;

FIG. 35 is a schematic block wiring diagram of another part of the manipulation circuit 5 in FIG. 19 showing a pattern shifting device;

FIGS. 36 through 41 show square matrices with shaded pattern shiftings for several different presets;

FIG. 42 shows a schematic block wiring diagram that is a part of the manipulator circuit 5 shown in FIG. 19 having a 48-bit shift register for centering a pattern on a matrix;

FIG. 43 is a schematic block wiring diagram of another part of the manipulator circuit 5 shown in FIG. 19 with a shift register for centering a pattern on a matrix;

FIG. 44 shows a FIG. 4 pattern on a matrix with their dotted center lines used for centering the FIG. 4 by the circuits shown in FIGS. 42 and 43;

FIGS. 45 through 48 show matrix squares each with a line for a pattern adjusted to a different slope;

FIG. 49 is a schematic block wiring diagram of the "jump"-detecting device in circuit 6 shown in FIG. 19;

FIG. 50 shows a "jump" pattern on a matrix;

FIG. 51 is a schematic block wiring diagram of the slope detecting device in circuit 6' shown in FIG. 19;

FIG. 52 is a more complete diagram of the circuit shown in FIG. 51;

FIGS. 53 through 57 show matrix patterns of terminal parts of different figure or character lines;

FIGS. 58 through 61 show matrix image elements of parts of different figure or character lines;

FIG. 62 is a schematic block wiring diagram of an extreme detecting device in circuit 6" shown in FIG. 19;

FIGS. 63 through 65 show some states of an output terminal of the shift register 88 shown in FIG. 62;

FIGS. 66 and 67 show other states of the output terminal of the register 88 shown in FIG. 62;

FIG. 68 shows the state of the output terminal of the register 88 shown in FIG. 62 for the condition for an extreme;

FIG. 69 is a schematic block wiring diagram of a device for marking intersections which is another part of the circuit 6" shown in FIG. 19;

FIGS. 70 and 71 show the relative states of the stages of shift registers 88, 104 and 105 in FIGS. 62 and 69;

FIG. 72 is a schematic block wiring diagram of a device for determining the number of terminal points comprising still another part of the circuit 6" shown in FIG. 19;

FIG. 73 is a schematic block wiring diagram of the circuit 7 shown in FIG. 19 illustrating the principle of forming a secondary image; and FIG. 74 is a schematic block wiring diagram of the circuit 8 shown in FIG. 19 for the detection of the properties of the secondary image from the circuit shown in FIG. 73.

DETAILED DESCRIPTION OF THE PREFERRED EMBODIMENT

Figure 23:
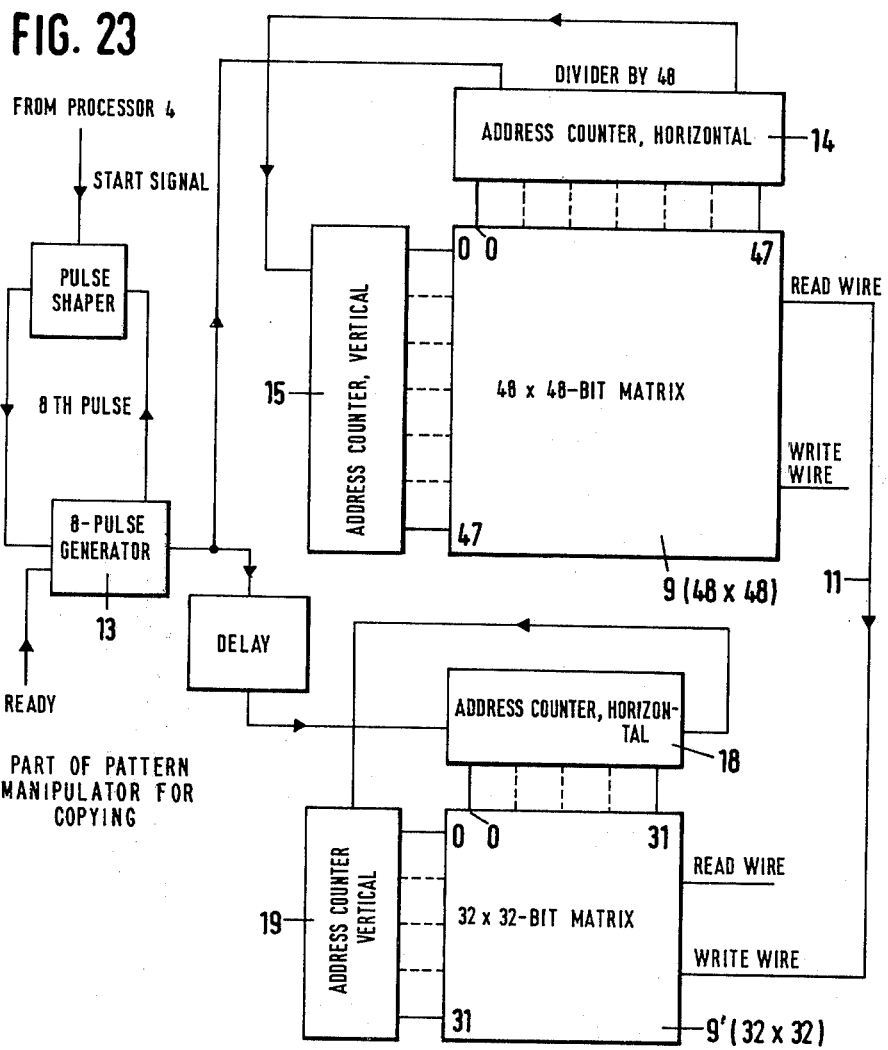
FIG. 23 is a schematic block wiring diagram of that part of the manipulator circuit 5 shown in FIG. 19 for the coupling of two stores for the different size concentric matrices shown in FIGS. 21 and 22.
Figure 53:
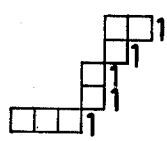
Figure 54:
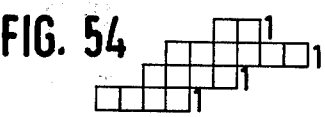
Figure 55:
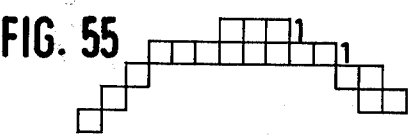

The steps and apparatus of circuits involved in performing the steps of the method, process, or system of this invention are described below in accordance with the following outline, first for the method and then for the apparatus:

I - Pattern Manipulation (FIGS. 2, 21 and 22)
  A. Copying
    1. Processor to store
    2. Store to processor
    3. Processor to 32 × 32 matrix, and vice versa (FIGS. 20 and 23)
  B. Rotating (FIGS. 24 to 34)
  C. Shifting (FIGS. 35 to 41)
  D. Centering (FIGS. 42 to 44)
  E. Adjusting (FIGS. 45 to 48)
  F. Other (erasing)
II - Properties of Images
  A. Partial Images
    1. Jumps (discontinuities of lines) (FIGS. 5, 6, 49 and 50)
    2. Slopes (FIGS. 3, 4, 7, 12 and 51-52)
      a. beginning
      b. end
      c. positive
      d. negative
    3. Terminal Points (FIGS. 13, 14 and 53-72)
      a. one-extreme
      b. two-intersections
      c. more than two
  B. Secondary Images - ("Islands") (FIGS. 15-18, 73, and 74)
    1. number
      a. one
      b. two
      c. three or more
    2. borders
      a. white
      b. black

THE METHOD

In the matrix of FIG. 1 the classes, K0–K9 in the case of figures, are arranged horizontally; the properties, $Ea$–$Ex$, being arranged vertically. $Wwy$ is the logarithmic probability value of the property $Ey$ for the figure $Kx$. The product-probability of all the properties of one class $Kx$ can be determined by adding up the logarithmic values of the relevant column $Kx$ in the matrix.

Figure 15:
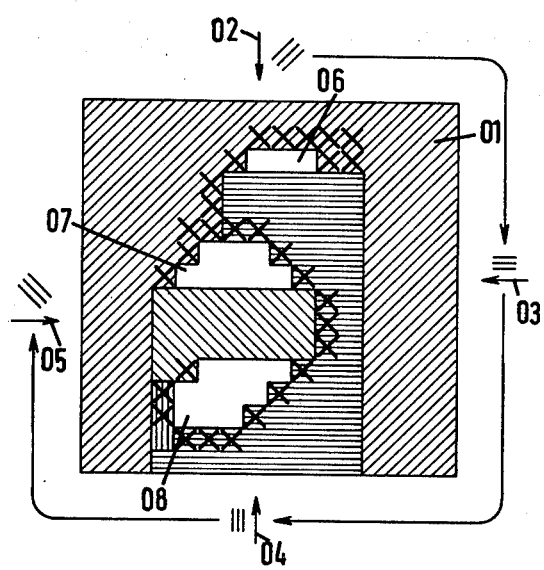
FIG. 15 shows in a demarcated rectangle, a complete pattern for a hand-written FIG. 5 and the four different hatched areas surrounding it considered during four successive 90° turns of the pattern.
Figure 16:
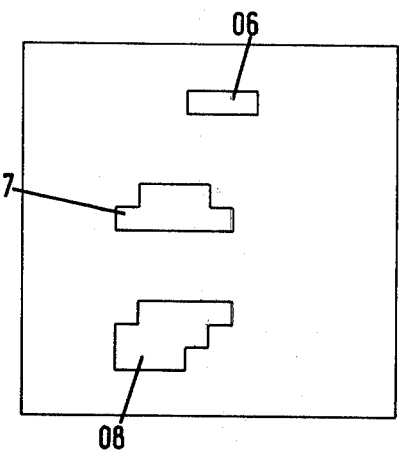
FIG. 16 is a secondary image derived from the pattern in FIG. 15 and containing three "islands" or areas not detected by the four successive turns of the matrix of this FIG. 5.

Properties are determined for the top, bottom, left-hand and right-hand aspect I, II, III, IV, of the complete pattern see arrows before (FIG. 2 a–d, respectively). Each pattern is then divided, horizontally as well as vertically, into two equal parts and properties are also determined for the various aspects see arrows in (FIG. 2 e–h) of the patterns thus divided, in which the halves are viewed from the left, from the right, from the bottom and from the top, respectively. In FIG. 2 the various images are represented as viewed from one observer's position at the left, the figure parts thus seen being drawn in full line. A probability matrix is drawn up for each of these aspects. In addition, a secondary image is formed from each of the characters to be recognized and properties are determined for the top, the bottom, the left-hand and the right-hand aspect. FIG. 15 gives an example of a complete pattern, and FIG. 16 shows a secondary image derived from it.

The properties of the partial images are divided into three groups, one of which relates to discontinuities of lines in an aspect (jumps), a second group relates to slope configurations of lines in an aspect, a third group relating to the presence of terminal points.

The properties of the secondary images relate to the number of partial areas (islands) of which they consist and on the manner in which each partial area is bordered. These properties too are determined for each of the aspects.

Quantized figure patterns consisting of binary image elements constitute the material started from. The figure patterns are available in rectangles of e. g. 32 × 32 image elements.

Use is made of several partial images, each of which is, as it were, the aspect of the figure pattern when viewed from the relevant direction.

The slope of a line in each of the partial images is considered positive or negative according to an agreement illustrated in FIG. 3. Consequently, the information is available as a set of dots, arranged in columns and rows. The co-ordinates are stated in the $x$ and $y$ directions, the positive directions being indicated by the arrows in FIG. 4, in which the aspects are numbered as I, II, III and IV. Each of the four partial images may contain a number of lines $\geq 1$. Seen from the relevant viewpoint a line consists of a concatenation of image elements and ends if it is not linked up with the image elements of the adjoining column.

According to the invention the properties are divided into groups. Within each group the properties belonging to it are arranged in classes of increasing complexity. A preferred version of the character recognition procedure utilizes four groups of properties in all. In every case one of the possible classifications is determined for each of the groups of properties of the partial and secondary images, so that no information can be lost for recognition.

In the preferred version the groups of properties relate to discontinuity of lines, slope configurations and terminal points in partial images and to the number of partial areas and their borders in secondary images.

IIA-I DISCONTINUITY OF LINES (JUMPS)

The relative positions of the lines can be classified on the basis of each of the four aspects I, II, III IV. There is a positive difference of relative distances if the beginning of a line is more distant from the side (of the rectangle) from which the pattern is viewed than the end of another line; and a negative difference if the beginning of a line is less distance from the side from which the pattern is viewed than the end of another line.

The following classification is used:
PS 0 : there is only one line in the aspect, so that no difference of distances can occur;
PS 1 : + only one positive difference of distances;
PS 2 : − only one negative difference of distances;
PS 3 : −+ a negative followed by a positive difference of distances;
PS 4 : +− a positive followed by a negative difference of distances;
PS 5 : + + two successive positive differences of distances;
PS 6 : − − two successive negative difference of distances;
PS 7 : there are more than three lines in the aspect.

FIG. 5 shows examples of this classification for a left-hand aspect, when the hand written figures are scanned from top to bottom, with the positive difference being indicated by arrows pointing to the right and negative differences being indicated by arrows pointing to the left. It is to be observed that a difference of the relative distances of two lines is classified as PS 0 if it is less than or $\leq 1/10$ of the width or the height of the enclosing rectangle for the whole figure or if it is smaller than one image element.

The data obtained are arranged in matrices, the elements of which are formed by the relative frequencies of occurrence of the properties. FIG. 6 shows four matrices, for aspects I, II, III and IV, respectively.

IIA-2 SLOPE CONFIGURATIONS

The definition of positive and negative slopes and of the scanning direction is illustrated by FIGS. 3 and 4. The slope configuration is determined and classified for each of the aspects. A slope always extends across a certain number of columns, when viewed from the relevant direction. The area is marked by a column number indicating the beginning and a column number indicating the end.

The beginning of a slope is defined by at least one of the following possibilities:
  the beginning of a line;
  a change of direction in at least two successive columns the direction of the line being opposite to that of the preceding part of the line.

The end of a slope is defined as follows:
  the end of a line;
  a change of direction in at least two successive columns the direction of the line being opposite to that of the preceding part of the line.

FIG. 7 gives some examples in the right-hand aspect. In this figure
  $a$ is the beginning of a negative slope;
  $b$ the end of a negative slope;
  $c$ the beginning of a positive slope and
  $d$ the end of a positive slope.

If at the beginning of a line a slope comprises only two adjoining image elements, this slope is not taken into account.

An aspect may exhibit several different configurations as regards the succession of slopes. Generally, this will also depend on the number of lines in the aspect.

If the aspect contains one line, the possibilities most frequently met are those illustrated in FIG. 8, which also gives the codings for the case of a right-hand aspect.

In the code used for expressing slope, configuratons four ternary positions are available. Only a small number of the $3^4 (= 81)$ possible combinations is actually used. The code is a ternary one, because each element can have three values: +, −, and 0.

The occurrence of some slope classification gives no warrant for conclusions about the shape of the aspect. Thus the classification XS 6 (FIG. 8) might also be found e.g. in an aspect in which occur two lines, as is shown in a right-hand aspect in FIG. 9.

In order to prevent small lines from determining the coding to a considerable extent, the rule has been adopted that in the case of more than one line occurring in an aspect the coding operation is carried out in succession, according to the lengths of the projections of the lines in the relevant aspect.

Thus in the case of the right-hand aspect of the pattern according to FIG. 10 the coding will be XS 5, because part 1 is longer than part 2. Consequently, part 1 is considered first and then part 2 so that the slope configuration found will be − + − 0.

As an aspect may contain more than one line, the classifications according to FIG. 11 have been introduced in addition (example of right-hand aspect), of which XS 11 has been reserved for all the other slope configurations, not covered by the codings XS O to XS 10.

Of the slope configurations too a matrix is drawn up for each of the aspects (FIG. 12), each element being formed by the relative frequency of occurrence of the relevant property in the set of the learning patterns presented.

IIA-3 TERMINAL POINTS

In each of the aspects terminal points are determine and classified as follows:
  PE 0 no terminal point in the relevant aspect;
  PE 1 one terminal point;
  PE 2 two terminal points and
  PE 3 more than two terminal points.

A probability matrix is drawn up again for each of the aspects. The search for terminal points is carried out at those points in the aspect where an extreme value occurs.

An extreme value occurs:
a at the end of a line with a negative slope;
b at the beginning of a line with a positive slope;
c is no slope is found, at the highest black image element or one
of the black elements in the top row;
d at the concurrence of a negative and a positive slope.

Examples of the occurrence of an extreme value according to a,b,c, and d are given in FIG. 13.

For detecting terminal points, the AND-function of the black image elements exhibiting extreme values is determined for a number ($r$) of rows, each time for two successive rows, counted from an extreme value. The AND-function obtained must always comprise a number ($m$) of consecutive black image elements.

In the case of a terminal point, the following condition will be satified:

$(m_{max} = 1 \text{ and } r \geq 3) V (m_{max} > \text{ and } r \geq 2 m_{max})$, in which $m_{max}$ is the largest number of consecutive black image elements in an AND-function, $r$ being the number of rows involved by the line with the extreme value.

FIG. 14 gives examples of terminal points in the top aspect.

II-B ISLANDS

From the pattern 01 shown in FIG. 15, starting from the top, a first part, hatched (+ 45°) as indicated near the arrow 02, is removed. Then, starting from the right-hand side, a second part hatched (horizontal) as indicated near the arrow 03 is taken away from what remained. Further, starting from the bottom, a third part hatched vertical as indicated near the arrow 04, and, finally, starting from the left-hand side, a fourth part, hatched (− 45°) as indicated near the arrow 05, are taken away. What remains is a "secondary" image consisting of three partial areas or islands, 06, 07 and 08. FIG. 16 shows this secondary image separately.

Figure 17:
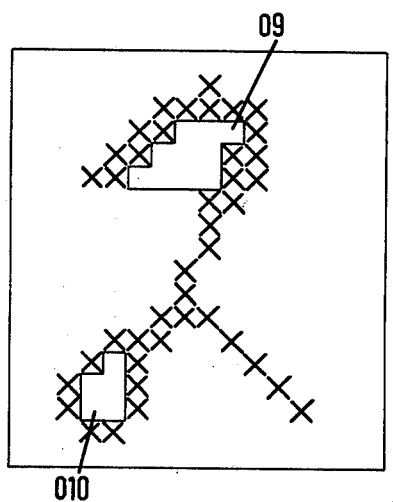
FIG. 17 shows a pattern for a hand-written FIG. 2 from which a secondary image containing two "islands" is obtained as in the manner shown in FIG. 15.

The pattern according to FIG. 17 has two islands. To be taken into consideration as such, an island has to fulfil the requirement that its projection comprises at least two image elements.

As regards the islands a pattern is viewed from four directions. As characteristic property is considered whether in the original pattern an island, viewed from the relevant direction, is bordered by white or by black image elements. If there is more than one island it is important that the order in which the islands are dealt with is defined.

In the example of FIG. 17 the following situations obtain:

|  | island 09 | island 010 |
|---|---|---|
| top aspect | black | black |
| bottom aspect | white | black |
| left-hand aspect | black | black |
| right-hand aspect | black | black. |

For each of the aspects the following classification can be adopted:
PT 0 no island
PT 1 1 island, bordered by white
PT 2 1 island, bordered by black
PT 3 2 islands -black, black
PT 4 2 islands - black, white
PT 5 2 islands - white, black
PT 6 2 islands - white, white
PT 7 3 or more islands.

As interruptions of lines also result in the division of islands in parts, the condition applies that islands between which there are no black image elements in the original pattern, shall be at least two image elements apart. If two areas are only one image element apart, they will be regarded as one island.

Figure 18:
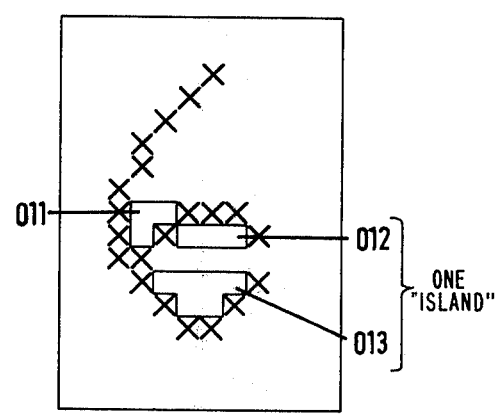
FIG. 18 shows a pattern for a handwritten FIG. 6 from which a secondary image containing a compound "island" is formed when scanned in the manner shown in FIG. 15.

In the example of FIG. 18 the areas 012 and 013 are considered as one island, because the white strip in between is only one image element wide. The areas 011 and 012 remain separate islands.

If in an aspect at least two adjoining image elements of an island border on white in the original pattern, the relevant island is considered to be bordered by white.

Consequently, in the example of FIG. 18 the codings for the aspects of the two "islands" 011 and combined 012 and 013 are:

| top | PT 5 white, black |
| bottom | PT 3 black, black |
| left | PT 3 black, black |
| right | PT 3 black, black |

THE APPARATUS

In the general block diagram of FIG. 19 the document 1 is projected onto a matrix and scanned by the optical scanner 2. The output signal of the scanner is digitized and quantized by the converter 3, after which it can be applied to the processor 4 in order to be recorded in the processor store.

Generally, the information on the processor store consists of a number of figure patterns written on the document 1. Each figure pattern to be recognized is applied to the pattern manipulator 5, by means of which partial images are formed. If the device is provided with a circuit for geometrically separating the patterns, the manipulator 5 can also be used to select the border strips.

The information of the partial images formed by means of the pattern manipulator is applied to circuits 6, 6', and 6" for detecting the properties of the partial images, i.e. jumps 6, slopes 6', and terminal points 6", respectively.

The information of the partial images can also be applied to a switching circuit 9A for forming secondary images, which are recorded in the working store 7. In a preferred embodiment the working store has 32 × 32 bit locations. The secondary images can be aplied to the circuit 8 for detecting the properties. The output terminals of the circuits 6, 6', and 6" and 8 are connected to input terminals of the processor 4, so that the codes of the properties found can be recorded in the processor store. The classification of the pattern is carried out in the processor 4 according to these properties.

The pattern manipulator 5 (FIG. 20) has a semiconductor matrix store 9 having 48 ×48 bit locations. Each separate bit can be written via a write wire 10 from the processor store 4 and read via a read wire 11, the relevant location being indicated by a address pulse on the horizontal and vertical sides, in a manner analogous to the way in which a core store is used.

By means of the pattern manipulator 5, in co-operation with the processor store 4 and possibly a second pattern manipulator, the date can be subjected to the following operations, which can take place in conjunction and simultaneously:
 a. copying, direct to or from another manipulator, such as stores 9 and 9' or the processor store 4;
 b. rotating, in multiples of 90°;
 c. shifting in multiples of 1 bit horizontally, vertically or the two simultaneously;
 d. centring;
 e. adjusting;
 f. other operations, e.g. erasing.

Figures 21, 22:
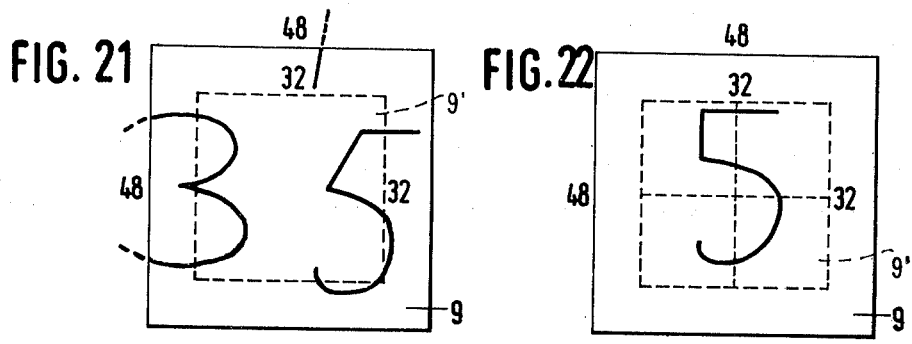
FIG. 21 shows a pattern of two FIGS. 3 and 5, overlapping a single demarcated area as projected onto a matrix store before their manipulation.
FIG. 22 shows a pattern of one of the FIGS. 5 shown in FIG. 21, after manipulation and its centering on the matrix store.

FIG. 21 and 22 give examples of combining some of the above-mentioned operations. FIG. 21 shows the data transferred from the processor store 4 to the manipulator store 9 (FIG. 20). FIG. 22 shows the data recorded in a matrix part 9' comprising 32 × 32 bit locations, in which the pattern has been geometrically separated, such as by shifting (c) and/or erasing (f), adjusted (e) and centered (d).

With regard to the operations mentioned under a-e the following observations can be made:

I-A COPYING The possibilities are:

1. from the processor 4 to the 48 × 48 matrix of store 9;
2. from the store 9 to the processor 4;
3. from the store 9 to e.g. a 32 × 32 matrix of the store 9' or vice versa;

I-A-1 (FIG. 20).

On a program instruction, the processor 4 delivers the first ADDRESS ACCEPTED (AA) signal, which causes the parallel writing of 8 bits at a time from the processor store (4) to the shift register 12 and thence to store 9.

These 8 bits are then shifted out of the register 12 via the write wire 10 to the store 9 by means of eight clock pulses delivered by the 8-pulse generator 13 on reception of the AA-pulse.

In addition, the clock pulses control a horizontal address counter 14. When this counter 14 has received 48 pulses, it passes an output pulse to the vertical address counter 15, causing the latter to do a step.

As soon as the generator 13 has finished, it passes an "8th pulse" signal to the break request (BR) input terminal of the processor 4. Then, when the latter has finished other operations, it delivers another AA-pulse and the process described above is repeated until the store 9 is completely filled, in lines from left to right and from top to bottom, with data from the processor 4.

Addressing the manipulator store 9 is done with the aid of the counters 14 and 15 or, if the data are to be shifted when written to the matrix 9' (see FIG. 23), with the aid of additional counters 21–24, as will be described under c (see FIG. 35). When the counters 14 and 15 reach their final states, a signal then formed blocks the 8-pulse generator 13, thus putting an end to the process.

I-A-2 (FIG. 20)

Contrary to what has been described under I-A-1, a shift register 16 is used in this case. During the readout of the store 9 this shift register 16 is filled with series data, which are then taken over in parallel by the processor 4 via data input terminals 17.

I-A-3 (FIG. 23)

The processor 4 is not required for taking over data from the 48 × 48 matrix of the memory 9 to a smaller matrix 9'. The processor 4 has only to give a start signal under program control and to receive a signal when the copying process has finished.

The addressing of the two matrices 9, 9' (48 ×48 and 32 ×32, respectively) takes place synchronously, but shifted in time.

The counters 18 (HORIZONTAL) and 19 (VERTICAL) are arranged as dividers by 32. The read wire 11 of the store 9 (48 × 48) is connected as a write wire to the store 9' (32 × 32). The addressing lag of the latter store with respect to the former is necessary because the read signal is only available after the relevant store location has been addressed, whereas data, when written, must be available when addressing takes place.

I-B ROTATING (FIGS. 24–31)

The principle on which the rotating process is based is illustrated in FIGS. 24–30. Instead of rotating the data themselves in the memory, the addressing can be changed. A rotation of 90° (FIGS. 24, 25) can thus be achieved by removing the addressing line - at first connected to the top side -to the right-hand side, the connections of the left-hand side being transferred to the top side. In the practical arrangement, however, only the top and the left-hand sides are available. FIGS. 28, 29 and 30 illustrate how the connections have to be arranged in order to give the desired rotations. These figures are the equivalents of FIGS. 25, 26 and 27 for rotations of 90°, 180° and 270°, respectively.

FIG. 31 illustrates how these operations can be implemented. The circuitry shown has to be provided 48 times. FIG. 31 shows the horizontal and vertical addressing line circuits for the location 0 (i.e. a column 0 and row 0) of the store matrix 9. As can be seen from FIGS. 24, 28, 29 and 30, the horizontal addressing line must be connected to address indication lines A0, B47, A47 and B0 for rotations of 0°, 90°, 180° and 270°, respectively. By means of one of the AND to gates $P_{H01}$ – $P_{H04}$ the relevant address indication line is connected via the OR-gate $P_{H0}$ to the addressing line. The vertical addressing line is switched in an analogous manner by means of the AND gates $P_{V01}$ to $P_{V04}$ and OR gate $P_{V0}$. For practical reasons, however, this switching is not effected at the address terminals of the matrix 9, but at the output terminals of the counters 14 and 15, where the counter state codes -6 bits per counter - are still available. Beyond the rotating circuit these data are decoded and passed, vertically as well as horizontally, to the 48 address terminals.

FIG. 32 illustrates the principle by a four-terminal divider, of which FIG. 33 is a wiring diagram. The two OR-gates OGl, OG2 are connected to a decoder D having a number of output terminals equal to the number of addressing lines to be controlled by it. The addressing data are available in a binary counter which, consequently, has fewer output terminals than there are addressing lines. The number of input terminals of the decoder D is equal to the number of output terminals of the binary counter. The desired connections between the output terminals of the binary counter and the input terminals of the decoder are established by means of the rotating device R (see FIG. 34). FIG. 34 is a block diagram of the rotating device R connected to the store 9.

I-C SHIFTING

For copying data from the processor store 4 to the store 9 of the pattern manipulator 5 (FIG. 20), the addressing of these stores can take place with the aid of the same counters 14 and 15. If the data are to be written to or from the store 9 with some shift, separate address counters - 23, 24 and 21, 22 (FIG. 35), respectively - have to be used for the store 9 and for the processor store 4, respectively. One or both of the address counters 23, 24 of the memory 9 is given an appropriate preset (V.I.), as controlled by the processor program, to obtain the desired shift. Moreover, it is possible to utilize only part of the 48 × 48 bit locations, e.g. 32 × 32, of the store 9' by switching over all the address counters - likewise under program control - from 48 to 32 dividers. The principle is illustrated in FIG. 35, the FIGS. 36 – 41 showing the results obtained with several different presets. The address counters 21 through 24 each constitute a 32 divider consisting of five binary dividers.

I-D CENTRING

Centring is a form of shifting in which the degree of shift is determined in a separate circuit with the aid of the OR-function of the whole figure pattern, horizontally as well as vertically. This OR-function is formed during the recording of the data in the store 9 by means of a 48-bit shift register SR, as shown in FIG. 42.

The preset of the address counters of the store 9, required for centering, is obtained with the aid of a separate counter, the shift counter 20 (FIG. 43). Firstly, the position of the centre line of the figure pattern has to be determined (FIG. 44). The OR-function of the entire pattern is formed when the last line (47) is recorded. The position of the centre line is found by first determining - in line 47 - the number of white image elements up to the beginning of the OR-function and then half the number of image elements of the OR-function itself (FIG. 44). A shift has to be effected, however, which is equal to the distance between the centre line of the matrix itself and the center line of the figure pattern. The centre line of the matrix lies at +24, the state of the shift counter will finally be exactly equal to the difference between the centre line of the figure pattern and the centre line of the matrix, i.e. the desired shift in horizontal direction. The state of the shift counter is now utilized as a preset for the horizontal address counter of the matrix.

After the pattern has been rotated, the vertical shift can be determined by means of a second shift counter and passed as a preset to the vertical address counter of the matrix, after which the entire figure pattern is transferred with the apropriate shift to another matrix or to the processor store 4, the centring operation thus having been carried out.

The position - now known - of the centred figure pattern in the matrix can often be utilized with advantage for carrying out further operations on it. In an analogous manner a figure pattern can e.g. be shifted against the left-hand and top sides of the matrix, if desired.

I-E ADJUSTING (FIGS. 45–48)
II-A-1 PARTIAL IMAGES - "Jumps"

If at the end of each line recorded in the matrix, an additional pulse is applied to the address counter 14, a vertical line (FIG. 45) in the original figure pattern will appear in the matrix as a line having a slope of 45° (FIG. 46). It is also possible to omit a pulse in each line, owing to which the line will be rotated by 45° in the opposite direction (FIG. 47). A smaller angle of rotation can be obtained by adding or omitting a pulse every two lines (FIG. 48). By this principle figure patterns can be adjusted to an upright position.

A description will now be given of a device for detecting and classifying discontinuity of lines in partial images. The data are supposed to be recorded in a 32 × 32 matrix forming part of the store 9' (see FIGS. 21–23 and 36–41). Suppose, for example, that the jumps in the left-hand aspect have to be detected. The data are shifted out row after row, beginning with the row 0. Each row contains the bit numbers 0–31.

In FIG. 49 the data are transferred via input 25, together with clock pulses via input 26, to an AND-gate 27. There is a device 28 for detecting the first black-to-white transition and a device 29 for detecting the first white-to-black transition. The clock pulses are applied via an AND-gate 30 to a counter 31, which counts these pulses until the first black-to-white transition has been detected. At the end of each row of image elements there appears a row-pulse at input 32. By means of AND-gate 33 the state of the counter 31 is tranferred to the buffer/down counter 34. Consequently, this buffer always contains data from the preceding row. The clock pulses are applied via the AND-gate 35 to the buffer/down counter 34, until the first white-to-black transition has been detected. At the beginning of each row the counter 31 has a preset of +2 bits or pulses. Consequently, the state of the buffer/down counter 34 is negative, if there is a jump S of more than 2 image elements (FIG. 50). The negative state of the down counter 34 is marked by the most significant bit of the counter. The counter 31 as well as the buffer/down counter 34 are used for ascertaining positive jumps.

An analogous combination of the counter 36 and the buffer/down counter 37 is used for ascertaining negative jumps. At the beginning of each fresh row, the counter 37 has a preset of bit -2.

Only in the case of black image elements occurring in the preceding row may the jump detection for negative jumps be active. For this purpose a device (trigger 38) for detecting black image elements has been provided. By means of the AND-gate 39 such an element is recorded in a buffer for 40 as buffer black. The AND-gate 42 is blocked, if there are no black image elements in the preceding row, and the AND-gate 41 is blocked, if there is no black image element in the row that is being examined. By this arrangement it is achieved that black elements in the first and the last rows of the pattern are prevented from causing jumps to be recorded.

At the end of each row the gates 41 and 42 are deblocked by a pulse in input 43 preceding the row pulse at input 32. If a positive jump has been detected, the gate 41 delivers a pulse. Likewise the gate 42 delivers a pulse if a negative jump has been detected. The code representing the jump configuration is formed by means of the OR-gate 44, the counter 45 and a shift register 46. The output pulses of the OR-gate 44 are counted by the counter 45 and used as clock pulses in the shift register 46. The binary counter 45 blocks itself after 3 pulses. If the pulse from he gate 41 is a 1, a 1 is recorded in the shift register 46. The states of shift register 46 and counter 45 for the various jump configurations as mentioned in Section II-A1 above and FIG. 5 are indicated below.

| classification of the jumps | shift register 46 | counter 45 |
|---|---|---|
| PS 0 no jump | 00 | 00 |
| PS 1 1 positive jump | 10 | 01 |
| PS 2 1 negative jump | 00 | 01 |
| PS 3 1 negative and 1 positive jump | 10 | 10 |
| PS 4 1 positive and 1 negative jump | 01 | 10 |
| PS 5 2 positive jumps | 11 | 10 |
| PS 6 2 negative jumps | 00 | 10 |
| PS 7 three or more jumps | XX | 11 |

II-A-2 PARTIAL IMAGES-SLOPES

In what follows a description will be given of equipment for detecting and classifying slope configuration (see block diagram FIG. 51). In this case too the data are supposed to be shifted row by row out of the 32 × 32 matrix 9' (FIGS. 21–23 and 36–41). Slope and jump configurations can be determined synchronously and simultaneously. There is a device 50 for detecting a positive slope and there is a device 51 for detecting a negative slope. If a positive slope is found, trigger 52 is set; while in the case of a negative slope, trigger 53 is set. The change of state of the trigger 52 or 53 causes a pulse to appear at the pulse shapes 54 or 55, respectively. At the beginning of the negative slope the trigger 52 is reset and at the beginning of a positive slope the trigger 53 is reset by means of OR-gates 56 and 57, respectively. At the end of each line of the configuration being analyzed, a signal is available at the output terminal of the gate 44 (FIG. 49) a "jump" pulse is given at the output terminal 48 by means of a trigger 47. At the beginning of the next row of image elements this trigger 47 is reset via an input terminal 49, owing to which, via the gates 56 and 57, the triggers 52 and 53 are reset as well.

The following results have thus been obtained:
a. every time a positive or negative slope begins, a pulse appears at the output terminal of the OR-gate 58;
b. the state of the trigger 59 indicates if this last slope registered is positive or negative.

The output of the OR-gate 58 is applied to the clock pulse terminal 60 of the 4-bit shift register 61. A representation of the sequence of positive and negative slopes is available at the output terminals of the shift register 61, the number of successive slopes being indicated by the output terminal of the counter 87. The output gates for the slope configurations can be connected to these output terminals.

FIG. 52 is a more complete block wiring diagram of the slope detection circuit shown in FIG. 51. Some signals can be obtained from the jump detecting device (FIG. 49). The data are taken from the output terminal 62' of the AND-gate 62 (FIG. 49). This output terminal 62' delivers a number of pulses equal to the number of image elements up to and including the first black element. This number is determined by means of the counter 63, which, at the end of the row of 32 image elements, delivers a row pulse via input 64. During this row pulse the data are transferred in parallel, by means of the AND-gates 65, to the buffer/down counter 66, to one of the input terminals of which the output terminal 62' of the gate 62 is again connected as well. If at the end of a row of image elements the contents of the buffer/down counter 66 is a positive number, this denotes a negative slope. There is a comparator >0 (67) for detecting a positive count and a comparator <0 (68) for detecting a negative count. The states of the two comparators are tested during a pulse via input 69, preceding the row pulse via input 64. The AND-gates 70 and 71 are also connected to the output terminal 40' of the buffer store 40 (FIG. 49). If during the pulse at input 69 the buffer/down counter 66 contains a positive number, the gate 71 delivers a pulse, which is applied to the AND-gate 74. The latter only delivers a pulse if the trigger 75 has been set, which denotes that the last slope detected vas negative too. The trigger 75 can be set by a pulse from the pulse shaper 76, this pulse being formed at the trailing edge of the pulse delivered by the gate 71. When a pulse appears at the output terminal of the pulse shaper 76, the trigger 78 is reset via the OR-gate 77. For the positive slope detection the analogous equipment consists of the gate 70, the pulse shaper 79, the trigger 78 and the AND-gate 81. It has been achieved thus that a change of slope only found in one row does not cause a pulse to appear at the output terminals of AND-gate 74 or 81. Only the changes in the slopes are of importance. For this purpose triggers 52 and 53 indicate the last slope observed. When a pulse appears at the output terminal of the AND-gate 74, the trigger 52 is set via the OR-gate 56. A pulse from AND-gate 81 resets via OR-gate 57 the trigger 53. At the end of a line of bits being tested, the triggers 78, 75, 52 and 53 are reset by means of and AND-gate 83.

If a jump (S) has been detected, trigger 47 (FIG. 49) is set during the pulse at input 43. Then, during a row pulse at input 32 or input 82, a pulse appears at the output terminal of the AND-gate 83. This cannot prevent the AND-gates 74 and 81 from delivering pulses when a jump (S) occurs. When the trigger 52 is set, in order to indicate that the beginning of a positive slope has been detected, a pulse becomes available at the output terminal of the pulse shaper 54. At the beginning of a negative slope a pulse appears at the output terminal of the pulse shaper 55. Only if no jump occurs in the relevant row, the slope can be accepted. During the row pulse at input 82, the polarity of an AND-gate 84 indicates whether no jump S occurs. So a signal denoting a positive slope is only available at the output terminal of the AND-gate 85, and a signal denoting a negative slope only appears at the output terminal of the AND-gate 86. A representation of the sequence of positive and negative slopes is available in the described manner at the output terminals of the shift register 61, the number of successive slopes being determined by an output counter 87.

II-A-3 PARTIAL IMAGE - TERMINALS

Now a description will be given of a device for detecting and recording terminal points.

For detecting terminal points, extremes have to be determined first. The easiest way of doing this is, at the same time when e.g. jumps and slopes in the left-hand aspect (see FIG. 2) are detected, to determine the extremes and, subsequently, the terminal points of the top aspect.

During the jump and slope analysis of the left-hand aspect of the data are shifted out of the 32 × 32 matrix (FIGS. 21–23 and 36–41) line by line. By means of the device to be described below terminal points possibly occurring in the top view are detected simultaneously with this operation. For detecting a terminal point, after an extreme has been found, the relevant line must be followed further. Therefore the various intersections are given serial numbers, on the condition that the line continues without bifurcation. A line that keeps satisfying this condition retains the same marking. In the examples of FIGS. 53–57 the scanning direction is from left to right; the serial number is given after the black-to-white transition. As soon as the condition is no longer met, no marking is given after the black-to-white transition.

Conditions for a correct connection with the preceeding row of image elements are:
a. the intersections in two successive rows must not be shifted by more than two image elements with respect to each other at the leading and the trailing edges. Examples: FIG. 58 correct; FIG. 59 incorrect.
b. in one and the same row a white-to-black transition must be preceded by at least 4 white image elements. Examples: FIG. 60 correct; FIG. 61 incorrect.

FIG. 62 is a functional block diagram of a device by means of which correct connections can be detected. Condition a. The fulfilment of this condition is checked by means of gate circuits connected to a shift register 88 having 36 one-bit sections. The trailing edge of an intersection can be detected at the output terminals 1 and 0 of shift register 88. If terminal 1 signals "black" and terminal 0 signals "white", the output polarity of the AND-gate 89 will change. Data from the preceding row of image elements are available at the output terminal 32 of the shift register 88. At the moment when the gate 89 changes polarity, output terminal 32 can signal "white" or "black". If it signals "black," the AND-gate 91 will change polarity together with gate 89. There are several situations in which the connection is considered correct. For the case of output 32 of register 88 signalling "white," when gate 89 changes polarity, see FIGS. 63, 64 and 65. Now one or more of the output terminals 33, 34 and 35 of register 88 must signal "black" (FIGS. 63–65). In the circuit this can be ascertained by means of an OR-gate 92. If the condition is not satisfied, a pulse appears at the output terminal of the AND-gate 93. The possibilities of correct connections for the case of output 32 of register 88 signalling "black" are illustrated in FIGS. 66 and 67. So in this case a "black" image element has to be signalled by one of the terminals 30 and 31 of register 88. In the circuit this is ascertained by means of an OR-gate 94. If the condition is not satisfied, a pulse appears at the output terminal of the AND-gate 95. Condition b. The leading edge of an intersection can be detected at the output terminals 0 and 1 of the shift register 96, which consists of five 1-bit sections. If terminal 0 signals "black" and terminal 1 signals "white" of the register 96, a change of polarity occurs at the output terminal of the AND-gate 97. The data concerning the preceding image elements is available at the terminals 2, 3 and 4 of the shift register 96. A white-to-black transition in the data supplied is only considered correct, if the terminals 1 to 4 of register 96 signal "white" at the moment its terminal 0 is "black". The "white" condition at the terminals 2, 3 and 4 of register 96 can be ascertained by means of the AND-gate 98. If the condition is not satisfied, the output polarities of AND-gates 99 and 97 change simultaneously. If a too narrow space between intersections is ascertained, the trigger 100 is set. The output of the OR-gate 101 indicates eventually whether a correct connection has been detected at the moment of a black-to-white transition in the data stream. Of course shift register 96 can form part of shift register 88. An extremity in a pattern can be determined with the aid of the AND-gates 103 and 102. The condition for an extremity is the situation according to FIG. 68. The situation of a "black" terminal 1 and a "white" terminal 0 of register 88 is signalled by the polarity of AND-gate 89. Trigger 100 must not be set in this case. The terminals 29 to 35 of register 88 must be "white." These conditions are obtained by means of the gate 103. If an extremity is ascertained, there will be a change of polarity at the output terminal of gate 102.

Intersections can be marked by means of a circuit (FIG. 69) containing shift registers 104 and 105. The circuits for determining the correctness of the connection and for detecting an extreme are connected to the shift register 88 (FIG. 62). The shift registers 104 and 105 can contain the serial number for each of the intersections; the serial number consists of 2 bits, either shift register 104 or 105 containing 1 bit.

In the initial state the shift registers 88, 104 and 105 are empty. As soon as an extreme has been detected, the state of the counter 106 is advanced by one step. At one clock pulse period the AND-gates 107 and 108 are deblocked, the counter state being passed via OR-gates 109 and 110 to the data input terminals of the shift registers 104 and 105. At the next clock pulse the data are taken up in the registers 104 and 105. These data are shifted through the shift registers 104 and 105 in synchronism with the shifting of data through the shift register 88 in FIG. 62. As the trailing edges of the intersections belonging to one line may be shifted with respect to each other, the relevant markings in the shift registers 104 and 105 may exhibit the same variations in place.

If in two successive rows the black-to-white transisitions are exactly one above the other, the situations illustrated in FIGS. 70 and 71 can occur at two successive clock pulses n and n+1. The last black-to-white transition indication is available at the output terminals 1 and 0 at shift register 88; and that of the preceding row can be found at its terminals 32 and 33. The coding of the relevant line (in this case 10) has been recorded in the registers 104 and 105. If at clock pulse n the connection is found to be correct, the data occurring at the output terminals 31 of the registers 104 and 105 are fed back to their input terminals via the OR-gates 111 and 112 and the AND-gates 114, 113, and OR-gates 110 and 109, respectively, to the data input terminals. If the connection is correct, the AND-gates 113 and 114 are deblocked. As the intersections may be shifted with respect to each other, the output terminals 29 to 33 of the shift registers 104 and 105 are connected via the OR-gates 111 and 112 to the AND-gates 114 and 113. Thus it has been achieved that a marking disappears in the case of a non-connection and that a line retains the same marking as long as the connection is correct.

The last step in the process is to find out if there are terminal points in an aspect and how many. FIG. 72 illustrates the principle of the relevant circuit by a functional block diagram. The black image elements in the data bitstream are counted by the counter 115. Means have been provided to restore the counter to the zero state as soon as fresh "white" bits appear via input r. The input terminals of an AND-gate 116' are connected to the output terminals 109' and 110' of the gates 109 and 110 of the circuit for marking intersections (FIG. 69). The output terminal of gate 116' changes polarity e.g. at serial number 01. The number of bits at the largest line thickness occurring must be recorded in a register 117. If the serial number 01 of an intersection has been detected, an AND-gate 118 will be in a position to deblock the AND-gates 119, providing the comparator 120 indicates that the register 117 contains a smaller number than the counter 115. At each fresh row of image elements a pulse will appear at the output terminal of the gate 116' providing the connection still exists. The number of these pulses is determined by a counter 121.

Conditions for a terminal point:
   a. content of register 117 is 001 and content of counter 121 is 0011;
   b. content of counter 121 is ≥ 2 × the content of register 117.

As soon as one of these two conditions is satisfied, a trigger 123 is set via an AND-gate 122, at least as fas as intersection 01 is concerned. Whether condition a is satisfied is ascertained by AND-gates 124, 125 and 126. A comparator 127 is used for determining whether condition b is fulfilled. The content of register 117 is a binary coded value (3 bits); and the counter 121 is a four-bit counter. The comparison of the three most significant bits of counter 121 with the three data bits of register 117 at the same time implies the introduction of the factor 2. The OR-gate 128 indicates whether one of the two conditions is satisfied. Trigger 123 can be set during an output pulse of gate 116'.

It is assumed that an aspect cannot contain more than 3 extremes. This means that three copies of the described circuit have to be provided, with the exception of counter 115. The counter 129 is used for recording how many terminal points have been found in an aspect. Therefore trigger 123 is connected via a pulse shaper 130 to the OR-gate 131. For the other terminal points, triggers 132 and 133 and pulse shapers 134 and 135 have been provided.

As regards resetting the various triggers, registers, counters etc. the following has to be observed: For each aspect, all registers, counters etc. are restored to the zero state. The circuit always operates as soon as a black-to-white transition is signalled at output terminals 1 and 0 of the shift register 88. After this operation when terminal 1 signals are "white" again, trigger 100 (FIG. 62) is reset, as well as counter 115 (FIG. 72). The reset pulse appears at the output terminal of a pulse shaper 136 (FIG. 62).

II-B SECONDARY IMAGES - "ISLANDS"

Finally a description will be given of a circuit for detecting and recording "islands" in secondary images. The formation of secondary images requires the working store 7 (see FIG. 19) in addition to the store 9.

Either of these stores has a capacity of at least 32 × 32 bits (FIG. 73). Both stores are addressed with the aid of counter 19 for the rows and counter 18 for the columns. The addressing lines of the two stores 7 and 9 are connected to the same output terminals of the counters 19 and 18. The store 9 is also utilized for determining the other properties. So the circuits for detecting jumps, slopes and terminal points are connected to the store 9. A pattern to be recognized is first supplied as a stream of white and black image elements (data) from the processor store 4 to the data input of the store 9 and, through the inverting amplifier 137, in inverted form to the data input of the store 7. When the properties are determined, the pattern contained in the square matrix memory 9 and is examined consecutively from each of its four sides. A secondary image is formed by recording "white" image elements in store 7 for each of the aspects, from the side of the aspect up to the place where the character begins. This means that of the inverted pattern shown in the matrix 7 in FIG. 73, the surface with the wide hatching will be "white." The islands remaining with the dense hatching will be "black".

The switching means 137 to 142 in FIG. 73 constitute the circuit designated by 9A in FIG. 19. The signal DT (FIG. 73) indicates that data are being transferred from the processor store 4 to stores 9 and 7. The data written in store 7 via OR-gate 138 are inverted by means of the inverting amplifier 137 are written to store 7.

Then the data contained in store 9 are read to the circuits for detecting jumps, slopes and terminal points in the aspects I, IV, II and III (FIG. 4). These data are also sent to the circuit 139, which detects the first white-to-black transition. At the aspects I, II and IV an AND-gate 141 is deblocked by means of an OR-gate 140. Via the OR-gate 138 0 data, corresponding to "white" in the pattern, are written to the store 7. The AND-gate 141 is blocked as soon as the first white-to-black transition is detected.

At the last aspect (aspect III) the islands can be completely defined and then properties can be determined. The data concerning the islands appear at the output terminal of the AND-gate 142. When the aspect III is being dealt with the output state of the gate 142 is 0 ("white") at the beginning of each row; as soon as the first white-to-black transition has been detected, the data are passed from store 7 to the output of gate 142.

The principle of determining the properties in circuit 8 (FIG. 19) can be explained by a simple example: If there is only one island in a pattern (FIG. 74), the data from the original pattern are written from store 9 to the shift register 143 (FIG. 74), which can contain 33 bits, i.e. 32 bits from one row plus one bit from the next row. The data appearing at the output 142' of gate 142 of the circuits 7 and 9A in FIG. 73 for forming the islands is transferred to the shift register 144, which also contains 33 bits. A black-to-white transition in the secondary image is signalled by the output of the AND-gate 145. If at the moment when the gate 145 changes polarity, the output 0 of the shift register 143 signals "white". This means that against the original pattern, the island borders on "white." In that case the AND-gate 146 changes polarity and the trigger 147 is set, thus signalling that the island borders on "white" at the right. A transistion from white to black in the secondary image is signalled by the output of the AND-gate 148. When this AND-gate 148 changes polarity at the same time the output 1 of the shift register 143 signals "white," the AND-gate 149 changes polarity and a trigger 150 is set, thus indicating that the island borders on "white" at the left. The situation at the top and bottom borders is determined by means of triggers 151 and 152, respectively. The upper border of the secondary image is signalled by a situation in which the output 0 of the shift register 144 is "black" and the output 32 of the same shift register is "white." If in that situation the output 32 of the shift register 143 is "white" as well, the gate 153 changes polarity and the trigger 152 is set, thus indicating that at the top the island is bordered by "white." In an analogous manner the trigger 151 is set if at the bottom the island is bordered by "white."

While there is described above the principles of this invention in connection with specific apparatus, it is to be clearly understood that this description is made only by way of example and not as a limitation to the scope of this invention.

What is claimed is:

1. In a character reading device having a matrix store for storing the lines consisting of marks corresponding optically to that character read and having a processor for processing the information detected from said matrix, the improvement comprising:
   A. means for manipulating said marks in said matrix store including separate means for copying and for rotating said marks in a rectangular matrix,
   B. means for scanning predetermined parts of said rectangular matrix including separate means for determining the location and number of the discontinuities, slopes and terminal points in the lines of said marks in each scanned part of said rectangular matrix, and
   C. means for forming a secondary image of the marks in said rectangular matrix including means for determining the number and borders of islands formed by said secondary image when said rectangular matrix is successively scanned from each of its four sides.

2. A device according to claim 1 wherein said means for copying includes shift registers.

3. A device according to claim 1 wherein said means for copying includes means for copying said rectangular matrix comprising horizontal and vertical address counters.

4. A device according to claim 3 wherein said means for copying said rectangular matrix includes a separate and smaller size matrix.

5. A device according to claim 3 wherein said means for rotating comprises means for controlling said horizontal and vertical address counters by 90° jumps.

6. A device according to claim 5 wherein said controlling means includes trigger means for dividing by four, and a decoder controlled by said trigger means.

7. A device according to claim 3 wherein said address counters comprise dividers composed of smaller dividers.

8. A device according to claim 7 wherein said address counters control the dividing of said rectangular matrix into said predetermined parts for said scanning means.

9. A device according to claim 1 wherein said manipulating means includes means for centering the pattern of said marks in the rectangular matrix, which centering means includes a shift register and a shift counter.

10. A device according to claim 1 wherein said means for determining and locating said discontinuities in lines in said rectangular matrix includes means for determining the first transitions to and from said marks and means for counting said transitions.

11. A device according to claim 1 wherein said means for determining the slopes in lines in said rectangular matrix includes comparative means for determining positive and negative directions of slope, pulse shapers, trigger means, a shift register, and counter means.

12. A device according to claim 1 wherein said means for determining terminal points of lines in said rectangular matrix comprises shift registers and logic circuits of AND-/and OR-gates, and comparator circuits.

13. A device according to claim 1 wherein said means for determining the borders of said islands comprises shift registers, logic circuits, and trigger circuits.

14. A character reading device comprising:
    a device (1) for projecting a character onto a matrix,
    a camera tube (2) for scanning the matrices,
    a store (9) for recording the scanning results,
    a converter (3) of the scanning results, and
    a processor (4) for handling the converted data,
    the improvement characterized by:
    A. a pattern manipulator (5) for forming partial images in which the character stored in said store is seen from several different inside and outside viewpoints, said manipulator including:
        a. a second matrix store for at least a part of said pattern,
        b. means for copying the stored pattern,
        c. means for rotating the stored pattern by multiples of 90°,
        d. means for shifting the stored pattern by multiples of one-bit in a horizontal and in a vertical direction,
        e. means for centering the stored pattern, and
        f. means for adjusting the stored pattern;
    B. circuit means connected to said manipulator for detecting the different properties of said partial images; and
    C. means connected to said detecting means for classifying said detected properties.

15. Device according to claim 14, wherein said cuit means includes means for detecting discontinuities or jumps of lines in partial images drawn from the store (9) comprising a counter (31) for determining the distance to the first black-to-white transition and a buffer/down counter (34) for determining the distance to the first white-to-black transition of the next row, these two counters together serving to detect a second positive jump, a counter (36) and a buffer/down counter (37) for detecting a second negative jump, devices (28, 29) for detecting a first black-to-white transition and a first white-to-black transition serving to block the counters; and wherein said classifying means comprises a counter (45) and a shift register (46) connected to the output terminals of said buffer/down counters.

16. Device according to claim 14, wherein said circuit means includes means for detecting slope configurations in partial images drawn from the store comprising: means for detecting a positive (50) and a negative (51) slope and the end of a line (44, 47), a shift register (61) for determining the succession of positive and negative slopes, and wherein said classifying means includes a counter (87) for determining the number of successive slopes (FIGS. 51, 52).

17. Device according to claim 14, wherein said circuit means includes means for detecting terminal points comprising: firstly a circuit (FIG. 62) for finding extremes by means of a shift register and a logic circuit for comparing two consecutive rows for a character pattern and at the same time discriminating according to predetermined conditions, secondly a circuit for scanning lines having extremes, a shift register (104, 105) being so arranged that a marking attributed to the line is suppressed when lines do not join, whereas it is maintained as long as the joining point meets the conditions set; and wherein said classifying means includes a circuit for determining the number of terminal points in an aspect, comprising a counter (115) for joined black image elements, a register (117) for the largest thickness of line occurring in an extreme, a comparator (120) for comparing the content of the counter (115) with that of the register (117), a second counter (121) for counting the rows of image elements in the case of a joint, a second comparator (127) for comparing the content of the register (117) with that of the counter (121), a logic circuit for discriminating the results of the comparisons according to predetermined conditions, and a counter (129) for recording the number of terminal points in an aspect (FIGS. 69 and 72).

18. Device according to claim 14 wherein said detecting circuit means includes a working store (7) and a circuit (9A) capable of forming a secondary image, consisting of partial areas called "islands", from the inverted information of the quantized pattern, and containing a device (139) for detecting first white-to-black transitions, the output terminal of which is connected to an AND-gate (141), owing to which all image elements not forming part of the character proper, from each of the sides of the rectangle enclosing the character, are ignored (FIG. 73).

19. Device according to claim 18, wherein said classifying means includes means for classifying the properties of secondary images comprising two shift registers (143, 144) for synchronously taking up data, notably for taking up data from the original pattern in one shift register (143) and data from the secondary image in the other (144), so that the nature of the border between an "island" and the original pattern can be established and recorded with the aid of a logic circuit of gates (145, 146, 148, 149, 153) and triggers (147, 150, 151, 152) (FIG. 74).

* * * * *

UNITED STATES PATENT OFFICE
CERTIFICATE OF CORRECTION

Patent No. 3,999,161   Dated December 21, 1976

Inventor(s) Jan Frederik Van Bilzem et al.

It is certified that error appears in the above-identified patent and that said Letters Patent are hereby corrected as shown below:

Page 1 of Patent, line 13 of Abstract, before "properties" insert - - circuits for simultaneous detection and classification of various - -;

Col. 1, line 48, delete "in which"
Column 1, line 49, after "phase" insert - - in which - -. Column 2, line 41, after "and" insert - - means - -; line 48, change "m✕x n" to - - m x n - -. Column 4, line 63, change "manipulation" to - - manipulator - -. Column 6, line 32, change "see arrows before (FIG." to - - (see arrows before FIG. - -; line 35, change "see arrows in (FIG." to - - (see arrows in FIG. - -; line 39, change "one" to - - an - -. Column 7, line 44, change "difference" to - - differences - -; line 54, cancel "less than or". Column 8, line 29, change "slope, configurations" to - - slope configurations, - -; line 63, change "determine" to - - determined - -. Column 9, line 37, change "vertical" to - - (vertical) - -. Column 11, line 3, change "date" to - - data - -; line 14, change "FIG." to - - FIGS. - -; line 22, change "a-e" to - - a through e above, - -; line 29, cancel "e.g. a 32 x 32 matrix of". Column 12, line 43, change "-" to - - to - -. Column 13, line 44, change "+24," to - - +24. If now the shift counter 20 is given a preset of -24, - -; line 65, "II-A-I PARTIAL IMAGES - "Jumps" " should be in Column 14, between lines 8 and 9. Column 14, line 43, change "bit -2" to - - -2 bit - -; line 49, change "buffer for 40 as buffer black" to - - buffer 40 as buffer for black - -; line 51, change "blocked" to - - blocked, and - -; line 67, change "he" to - - the - -; line 67, change "1" (second occurrence) to - - "1" - -. Column 15, line 1, after "46" insert - - . The states of shift register 46 - -; line 29, change "shapes" to - - shaper - -. Column 16, line 14, change "vas" to - - was - -; line 65, second occurrence, delete "of";

UNITED STATES PATENT OFFICE
CERTIFICATE OF CORRECTION

Patent No. 3,999,161        Dated December 21, 1976

Inventor(s) Jan Frederik Van Bilzem et al

It is certified that error appears in the above-identified patent and that said Letters Patent are hereby corrected as shown below:

Column 17, line 35, after "signals" insert --"white" at that moment, the AND-gate 90 will change polarity; if it signals--.
Column 19, line 22, change "fas" to --far--; line 23, underline "a". Column 20, line 5, change "consecutively" to --consequently--. Column 21, line 65, after "means" insert--in--.
Column 22, line 33, change "cuit" to --circuit--.

Signed and Sealed this

Third Day of May 1977

[SEAL]

Attest:

RUTH C. MASON
*Attesting Officer*

C. MARSHALL DANN
*Commissioner of Patents and Trademarks*